United States Patent
Bhatnagar et al.

(10) Patent No.: US 12,159,102 B2
(45) Date of Patent: Dec. 3, 2024

(54) UNIVERSAL CONTENT FOR EMAIL TEMPLATE

(71) Applicant: Klaviyo Inc., Boston, MA (US)

(72) Inventors: Shresth Bhatnagar, Boston, MA (US); Daniel Kezerashvili, Boston, MA (US); Nikita Shenkman, Boston, MA (US)

(73) Assignee: Klaviyo Inc., Boston, MA (US)

( * ) Notice: Subject to any disclaimer, the term of this patent is extended or adjusted under 35 U.S.C. 154(b) by 0 days.

(21) Appl. No.: 17/839,357

(22) Filed: Jun. 13, 2022

(65) Prior Publication Data

US 2022/0414325 A1 Dec. 29, 2022

Related U.S. Application Data

(60) Provisional application No. 63/216,033, filed on Jun. 29, 2021.

(51) Int. Cl.
G06F 40/186 (2020.01)
G06F 16/955 (2019.01)
G06F 40/166 (2020.01)

(52) U.S. Cl.
CPC .......... *G06F 40/186* (2020.01); *G06F 16/955* (2019.01); *G06F 40/166* (2020.01)

(58) Field of Classification Search
CPC .............................. G06F 40/14; G06F 40/186
USPC ........................................................ 715/234
See application file for complete search history.

(56) References Cited

U.S. PATENT DOCUMENTS

| | | | |
|---|---|---|---|
| 6,424,997 B1 | 7/2002 | Buskirk, Jr. et al. | |
| 7,213,202 B1 * | 5/2007 | Kagle | G06F 40/151 715/235 |
| 7,257,772 B1 * | 8/2007 | Jones | G06F 40/166 715/234 |
| 7,287,218 B1 | 10/2007 | Knotz et al. | |
| 7,533,090 B2 | 5/2009 | Agarwal et al. | |
| 7,752,607 B2 | 7/2010 | Larab et al. | |
| 7,845,950 B2 | 12/2010 | Driscoll et al. | |
| 7,975,000 B2 | 7/2011 | Dixon et al. | |
| 7,975,223 B2 | 7/2011 | Plumley et al. | |
| 8,250,470 B2 * | 8/2012 | Takashima | G06F 40/186 715/244 |
| 8,341,224 B2 | 12/2012 | Kasetty et al. | |
| 8,434,002 B1 | 4/2013 | Shah et al. | |

(Continued)

OTHER PUBLICATIONS

11 Best Drag and Drop Word Press Page Builder Plugins, by Anna Fitzgerald, Nov. 13, 2020, pp. 1-21; https://blog.hubspot.com/website/top-5-free-drag-and-drop-wordpress-page-builder-plugins (Year: 2020).

(Continued)

*Primary Examiner* — Maikhanh Nguyen
(74) *Attorney, Agent, or Firm* — Richard Batt; Brian Short

(57) ABSTRACT

Methods and systems for optimized template data management are disclosed. By enabling direct access to the shared universal content data, the template management system can replicate the selected universal content either within one template or across several templates. Furthermore, the universal content can be a section that comprise sub-components or a block that comprises subblocks. The present subject matter can improve computer and network efficiency by eliminating duplicative universal content data.

17 Claims, 20 Drawing Sheets

(56) References Cited

U.S. PATENT DOCUMENTS

| | | | |
|---|---|---|---|
| 8,484,156 B2* | 7/2013 | Hancsarik | G06F 9/544 |
| | | | 707/602 |
| 8,751,327 B2 | 6/2014 | Park et al. | |
| 9,237,233 B2 | 1/2016 | Soundar | |
| 9,430,454 B2 | 8/2016 | Newman et al. | |
| 9,892,420 B2 | 2/2018 | Sterns et al. | |
| 10,248,657 B2 | 4/2019 | Prahlad et al. | |
| 10,331,775 B2 | 6/2019 | Ryan et al. | |
| 10,614,501 B2 | 4/2020 | Fredrich et al. | |
| 10,701,005 B2 | 6/2020 | Nutt et al. | |
| 10,728,200 B2 | 7/2020 | Miller et al. | |
| 10,817,663 B2 | 10/2020 | Weald et al. | |
| 11,070,511 B2 | 7/2021 | O'Brien et al. | |
| 11,144,198 B2 | 10/2021 | Chen et al. | |
| 11,144,980 B2 | 10/2021 | Fredrich et al. | |
| 11,265,271 B2 | 3/2022 | Tetreault et al. | |
| 11,880,650 B1 | 1/2024 | Li et al. | |
| 2005/0273705 A1* | 12/2005 | McCain | G06F 40/186 |
| | | | 715/764 |
| 2006/0225040 A1 | 10/2006 | Waddington | |
| 2008/0178073 A1 | 7/2008 | Gao et al. | |
| 2008/0189156 A1 | 8/2008 | Voda et al. | |
| 2009/0006936 A1 | 1/2009 | Parker et al. | |
| 2009/0125518 A1 | 5/2009 | Bailor et al. | |
| 2010/0281074 A1 | 11/2010 | Bailor et al. | |
| 2011/0078246 A1 | 3/2011 | Dittmer-Roche | |
| 2012/0042239 A1* | 2/2012 | O'Brien | G06F 40/186 |
| | | | 715/243 |
| 2012/0233554 A1 | 9/2012 | Vagell et al. | |
| 2012/0294514 A1 | 11/2012 | Saunders et al. | |
| 2013/0124956 A1 | 5/2013 | Hatfield et al. | |
| 2014/0033101 A1 | 1/2014 | Rein et al. | |
| 2014/0278747 A1 | 9/2014 | Gumm | |
| 2014/0282125 A1* | 9/2014 | Duneau | G06F 9/451 |
| | | | 715/762 |
| 2016/0070717 A1 | 3/2016 | Bergner et al. | |
| 2016/0117717 A1 | 4/2016 | Moreau et al. | |
| 2016/0132472 A1* | 5/2016 | Campbell | G06F 40/197 |
| | | | 715/229 |
| 2016/0241502 A1 | 8/2016 | Georgiou | |
| 2017/0019697 A1* | 1/2017 | Hundemer | H04N 21/47214 |
| 2018/0081868 A1 | 3/2018 | Willcock et al. | |
| 2019/0043106 A1 | 2/2019 | Talmor et al. | |
| 2019/0121827 A1 | 4/2019 | Boswell et al. | |
| 2019/0197092 A1 | 6/2019 | Thiesen et al. | |
| 2019/0228063 A1* | 7/2019 | El-Sherif | G06Q 10/00 |
| 2020/0013092 A1 | 1/2020 | Liu et al. | |
| 2020/0356624 A1 | 11/2020 | Cai et al. | |
| 2021/0389962 A1* | 12/2021 | Li | G06F 9/44505 |
| 2022/0036311 A1* | 2/2022 | Didrickson | G06F 16/93 |
| 2022/0113853 A1 | 4/2022 | Nostrini et al. | |
| 2022/0188740 A1 | 6/2022 | Nazarali et al. | |
| 2023/0298368 A1 | 9/2023 | Berger et al. | |

OTHER PUBLICATIONS

Lindholm (A 3-way Merging Algorithm for Synchronizing Ordered Trees-the 3DM merging and differencing tool for XML, published Sep. 2001, pp. 1-205) (Year: 2001).

Lindholm (A Three-way Merge for XML Documents, published Oct. 2004, pp. 1-10) (Year: 2004).

Lindholm (XML Three-way Merge as a Reconciliation Engine for Mobile Data, published Sep. 2003, pp. 1-5) (Year: 2003).

WordPress Editor: Working With Blocks »Blocks, Jan. 1, 2021, pp. 1-6; https://wordpress.com/supporUwordpress-editor/blocks/ (Year: 2021).

* cited by examiner

620

Template 600 in a Relational Database

Body 602

| id | settings |
|---|---|
| 001 | {} |

Section 604

| id | settings | body | position |
|---|---|---|---|
| 001 | {} | 001 | 0 |
| 002 | {} | 001 | 1 |

Row 606

| id | settings | section | position |
|---|---|---|---|
| 001 | {} | 002 | 0 |
| 002 | {} | 002 | 1 |

Column 606

| id | settings | row | position |
|---|---|---|---|
| 001 | {} | 001 | 0 |
| 002 | {} | 001 | 1 |

Block 608

| id | settings | column | position |
|---|---|---|---|
| 001 | {} | 002 | 2 |
| 002 | {} | 002 | 1 |
| 003 | {} | 002 | 0 |
| 004 | {} | 002 | 3 |

*FIG. 6B*

UNIVERSAL CONTENT FOR EMAIL TEMPLATE

CROSS-REFERENCES TO RELATED APPLICATIONS

This application claims the benefit of U.S. Provisional Patent Application No. 63/216,033, entitled "Template Serialization for Pre-rendering and Versioning," filed Jun. 29, 2021, which is incorporated herein by reference for all purposes.

TECHNICAL FIELD

The present subject matter relates to systems and methods for data integration, modification, and edition of an electronic mail template. More specifically, the present subject matter relates to efficient computer-aided management of template files. The present subject matter also relates to systems and methods for improving computer and network speeds.

BACKGROUND

Digital marketing has become a powerful way to promote a business's products and services to its customers. It helps the customers to be aware of the business's latest offerings. Among digital marketing's various tools, computer-compiled marketing emails can directly deliver the most relevant content to a customer. Such emails can be generated based on modifying a template email according to the specific offering, the customer's preference, or other factors. For example, marketing emails can be personalized based on the customer's past interaction with the brand.

To achieve that, the template email needs to be modified to add personalized content. For example, a user can create a selected portion of the template for repetitive use in another template. Traditionally, this operation is achieved by making a copy of the selected portion, which can consume a substantial amount of network and computing power. As such, there are a lot of areas for improving the computing system performance in template management.

SUMMARY OF THE INVENTION

The present subject matter describes improved methods for template component and data management via a computer network. When creating a template, a user can select a portion of the template for repetitive use, e.g., a universal content. This operation is typically achieved by making a copy of the universal content data, which can consume substantial network and computing power. In the present subject matter, to generate a universal component that can be archived and reused, the template management system can establish a relationship between the target template and the universal component by generating an embedded pointer directing to it. A pointer can describe the access path or address of the universal component within a relational database. The pointer can enable direct access to the universal component, i.e., the data tables. As such, a universal component with the same content and format can be replicated in one template or across different templates.

According to some embodiments, the universal content of the present subject matter can be a section that comprise sub-components such as rows, columns, blocks and sub-blocks. The universal component can also be a block that comprises subblocks.

Compared with other template management approaches, the present subject matter can improve computer and network efficiency. It also saves computing resources by avoiding duplicating universal content data.

Furthermore, as the universal component is inherently shared, any modification to the universal component is immediately reflected in any templates that have incorporated it. By contrast, if the system had made a copy of the universal component for each target template, any modification of the universal component has to be individually implemented in each copy of the universal component. As such, by eliminating the copied universal content data, the present approach can simplify and streamline the data management process related to the universal component.

A computer implementation of the present subject matter comprises a computer-implemented method of template management, the method comprising receiving, at a template management server, a first template comprising a first plurality of components, receiving a designation of a universal component from the first plurality of components, saving component data of the universal component, wherein the component data comprises various component attributes that define the content and format of the universal component, receiving a selection of the universal component in a second template, generating a pointer directing to the component data of the universal component, and retrieving the component data of the universal component for rending the second template. According to some embodiments, the method further comprises displaying, on a client device, a template editor that is configured to customize the first template and the second template. According to some embodiments, the method further comprises displaying the designated universal component in the template editor on a client device.

According to some embodiments, the method further comprises retrieving position data of the universal component within the second template, wherein the position data indicates a position of the universal component and displaying the universal component at the position based on the retrieved position data within the second template.

According to some embodiments, the method further comprises receiving a modification of the universal component related to one of the first templates and the second template and updating the component data of the universal component based on the modification for both the first template and the second template.

According to some embodiments, the method further comprises disconnecting the component data of the universal block to the second template and generating a copy of the component data of the universal component for the second template so that further modification of the copy of the component data via the second template does not impact the component data of the universal block.

According to some embodiments, the universal component can be a section that can comprise one or more sub-components such as rows, columns, and blocks. The universal component is a block that can comprise one or more subblock.

Another computer implementation of the present subject matter comprises a computer-implemented method of template management, the method comprising receiving, at a template management server, a designation of a universal component, saving component data of the universal component, wherein the component data comprises various component attributes that define the content and format of the universal component, receiving one or more template comprising the universal component, retrieving the component data of the universal component via one or more pointers directing to the component data of the universal component, retrieving respective position data of the universal component, wherein the respective position data indicates a position of the universal component within the one or more template, and displaying, at one or more client device, the universal component within the one or more template at the position based on the respective position data.

Another computer implementation of the present subject matter comprises a computer-implemented method of template management, the method comprising receiving a designation of a universal content, saving component data of the universal content, wherein the component data comprises various component attributes that define the content and format of the universal content, receiving a request to add the universal content to a template, retrieving the component data of the universal component via establishing a relationship between the template and the component data of the universal content, and displaying the universal content within the template.

Other aspects and advantages of the present subject matter will become apparent from the following detailed description taken in conjunction with the accompanying drawings, which illustrate, by way of example, the principles of the present subject matter.

DESCRIPTION OF DRAWINGS

The present subject matter is illustrated by way of example, and not by way of limitation, in the figures of the accompanying drawings in which:

FIG. 6B shows an exemplary template stored in a relational database, according to one or more embodiments of the present subject matter;

DETAILED DESCRIPTION

The present subject matter pertains to improved approaches for a template management system. Embodiments of the present subject matter are discussed below with reference to FIGS. 1-18.

In the following description, for purposes of explanation, numerous specific details are set forth in order to provide a thorough understanding of the present subject matter. It will be apparent, however, to one skilled in the art that the present subject matter may be practiced without some of these specific details. In addition, the following description provides examples, and the accompanying drawings show various examples for the purposes of illustration. Moreover, these examples should not be construed in a limiting sense as they are merely intended to provide examples of embodiments of the subject matter rather than to provide an exhaustive list of all possible implementations. In other instances, well-known structures and devices are shown in block diagram form in order to avoid obscuring the details of the disclosed features of various described embodiments.

The following sections describe systems of process steps and systems of machine components for efficiently updating a template. These can be implemented with computers that execute software instructions stored on non-transitory computer-readable media. An improved template management system can have one or more of the features described below.

Figure 1:
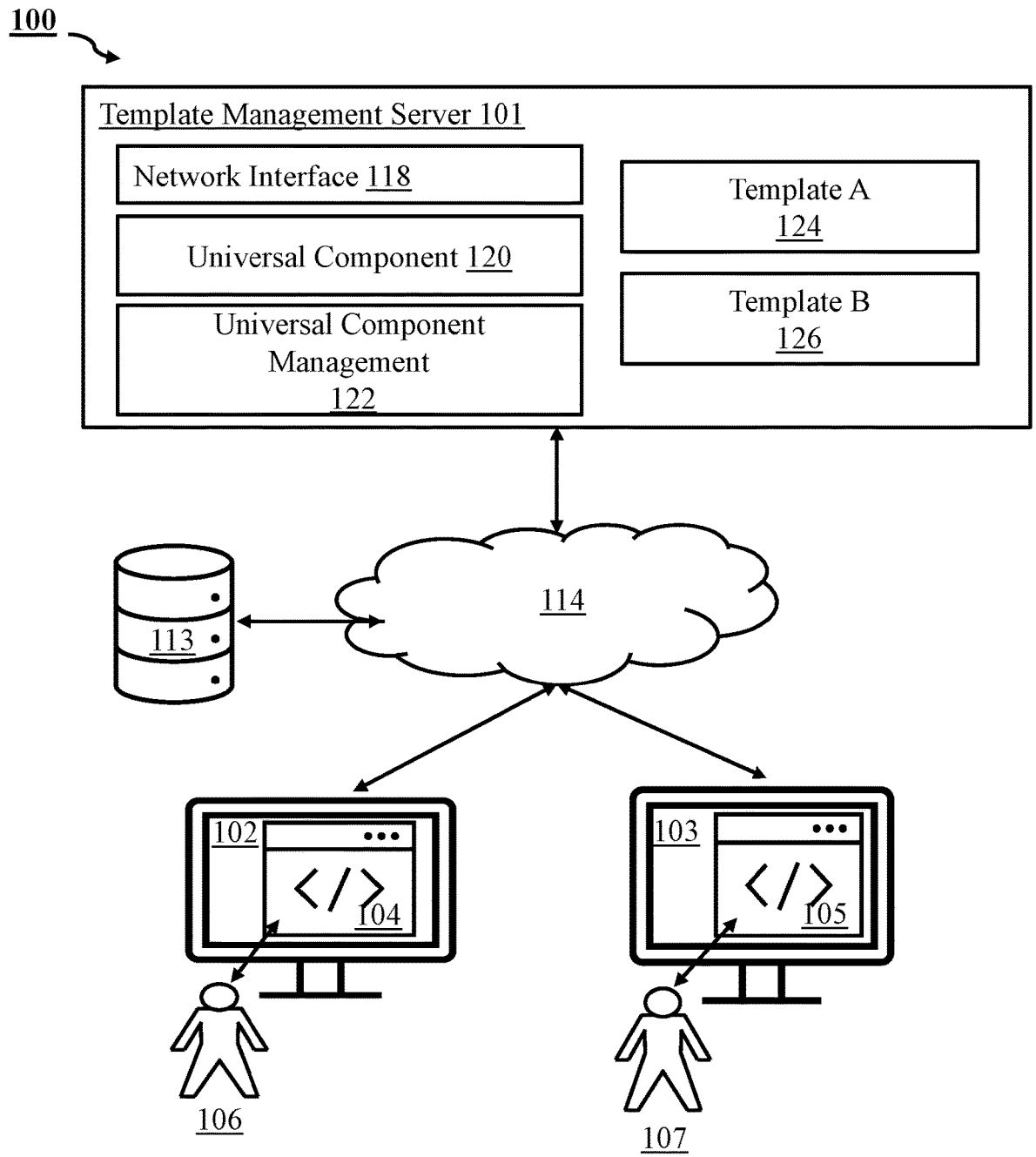
FIG. 1 shows an exemplary diagram of a template management system with universal components, according to one or more embodiments of the present subject matter.

FIG. 1 shows an exemplary diagram of a template management system 100 with universal components according to the present subject matter. In the present disclosure, a template can comprise a computer-compiled HTML web page. According to some embodiments, a template can comprise a number of components, such as body, sections, rows, columns, blocks, and subblocks. The template, with its data schemas that define the structure and content of it, can be stored in a relational database, e.g., the MySQL™ database.

For example, the template can be an email template with structures and components that can be modified by a computing device or a client device. The template can be stored in a database 113. According to some embodiments, the email template can be marketing emails that can directly deliver relevant content to a customer. These marketing emails can be generated by modifying a template email according to various factors such as the specific offering or the customer's previous behavior data.

According to some embodiments, a database schema can define how data of a template email is organized within a relational database. Such database schema can comprise various logical constraints such as component names, fields, data types, and the relationships between these entities.

As shown in FIG. 1, a first user 106 can create and edit a first template 104 via a first client device 102, which can communicate with a database 113 and a template management server 101 via a network 114. A second user 107 can also create and edit a second template 105 via a second client device 103. A client device can be a computing device that has at least one input interface for creating and editing a template and at least one network interface for network connection. A universal component can be adopted by multiple templates, such as first template 104 and second template 105. A universal component can also be replicated within the same template.

Network 114 can comprise a single network or a combination of multiple networks, such as the Internet or intranets, wireless cellular networks, local area network (LAN), wide area network (WAN), WiFi®, Bluetooth®, near-field communication (NFC), etc. Network 114 can comprise a mixture of private and public networks or one or more local area networks (LANs) and wide-area networks (WANs) that may be implemented by various technologies and standards.

Template management server 101 can comprise a number of modules or units to implement functions of the present subject matter. According to some embodiments, template management server 101 can implement functions related to network interface 118, universal component 120, universal component management 122, and/or one or more template such as template A 124 and template B 126.

According to some embodiments, template management server 101 can display a template editor that allows a user or editor to customize a template email. For example, the template editor can display a plurality of email templates for the user to browse and select. The template editor also can enable the user to drag and drop a selected email template to a canvas area for further modification.

Figure 5:
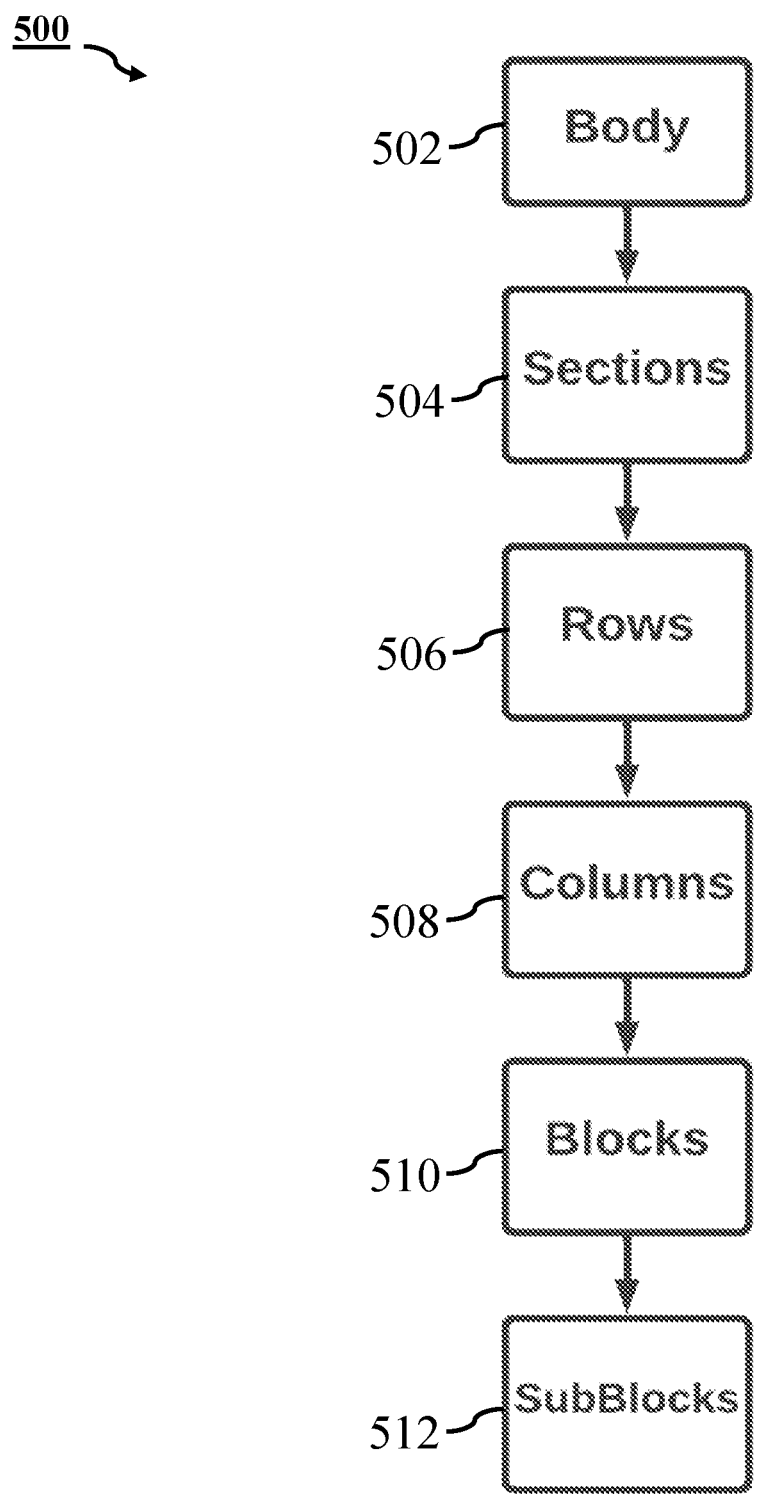
FIG. 5 shows exemplary hierarchical components of a template, according to one or more embodiments of the present subject matter.

According to some embodiments, template management server 101 can receive a first template 104 comprising a number of hierarchical components or nodes, as illustrated in FIG. 5. First user 106 can designate a component or block as a universal component. A universal component is an archived data item with the same content and format that can be replicated in the same template or in other templates. For example, a universal component can be a block with various data attributes to define the content and look of the block. A universal component can also be a section that comprise rows, columns and blocks.

Upon receiving a designation of the universal component, template management server 101 can save its component data in a relational database. According to some embodiments, the system can use identifiers for the physical and logical location of the data. For example, the system can assign a distinct object identifier (OID) to uniquely identify the component data in the corresponding data table. An OID can be a string of decimal numbers that uniquely identifies an object. Furthermore, the component data can comprise various component attributes that define the content and format of the universal component, e.g., the text, image, font size, and/or colors.

According to some embodiments, template management server 101 can display the designated universal component as an archived item in the template editor in both first template 104 and second template 105. For example, the system can show a folder to store and display a number of universal components.

The second user 107 can access the universal component while editing a second template 105. For example, second user 107 can select and drag a universal component into a desired position in second template 105. To access the universal component data, template management server 101 can create an embedded pointer configured to direct to the component data. A pointer can describe the access path or address of the universal component within a relational database.

According to some embodiments, the system can retrieve position data of the universal component within second template 105. The position data can correspond to the first user's "drag-and-drop" selection within the template editor. With the embedded pointer, template management server 101 can retrieve the universal component data and display it at a selected position within second template 105.

According to some embodiments, the system can retrieve position data of the same universal component within first template 104. The position data can correspond to the first user's "drag-and-drop" selection within the template editor.

As both templates inherently share the same universal component, any modification to the universal component is immediately reflected in both templates. According to some embodiments, when a modification of the universal component is made through either first template 104 or second template 105, the change can be immediately reflected in both templates. For example, first user 106 can change font size of a universal component in first template 104. As the data attributes are changes in the shared data tables, the font size of the same universal component in second template 105 is also immediately changed. By contrast, if the system had made a copy of the universal component for each target template, any modification of the universal component has to be implemented in each copy of the universal component. As such, the present approach can efficiently simplify and streamline the data management related to the universal component.

According to some embodiments, template management server 101 can provide an option to disconnect a universal component to a specific template. For example, when first user 106 changes the font size of the universal component in first template 104, the system can display an option as to whether to implement the changes to second template 105. When first user 106 selects not to implement the changes to second template 105, template management server 101 can generate a copy of the universal component data and dedicate it for second template 105. The dedicated universal component data for second template 105 can be independent from the shared universal component data so that further modifications of the original universal component do not impact it. Similarly, any changes made to the duplicative and disconnected universal component data can not impact the original shared universal component data. As such, the present template management system can flexibly manage the universal components based on the needs.

Figure 2:
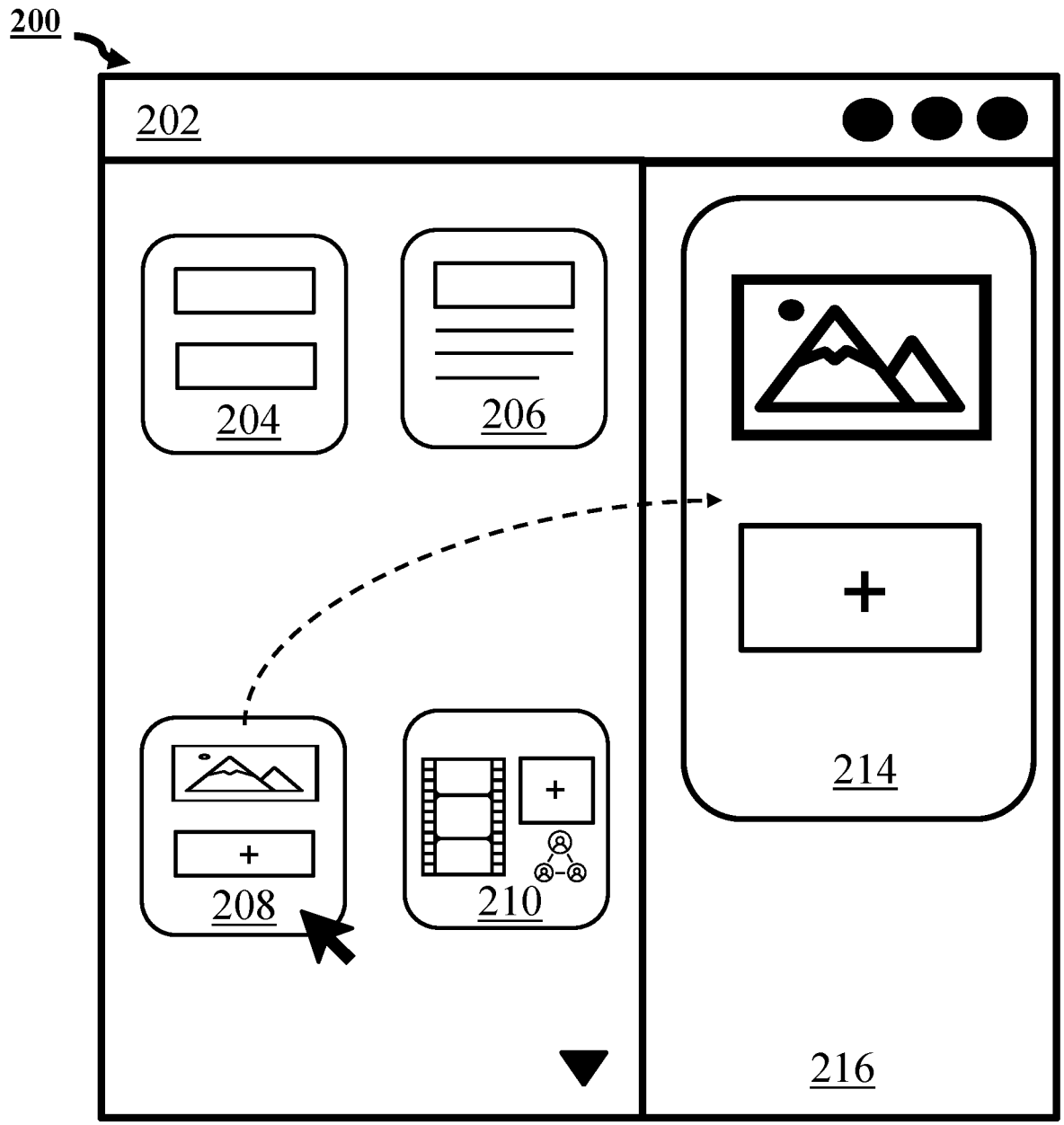
FIG. 2 shows an exemplary interface to create an email template using a template editor 202, according to one or more embodiments of the present subject matter.

FIG. 2 shows an exemplary user interface 200 to create an email template using a template editor 202, according to some implementations of the present subject matter. As shown in FIG. 2, the template management system can display template editor 202 on a display of a computing device. Template editor 202 can provide an optimized process for generating effective and appealing emails in a marketing campaign.

According to some embodiments, template editor 202 can comprise one or more pre-generated base templates 204, 206, 208 and 210, which are configured to reduce time building marketing campaign/flow emails. Each of the base templates can feature different designs and themes, for example, to promote goods and services for different customer groups. By selecting a preferred base template 208, a user can drag-and-drop base template 208 to a blank editor space 216, or a canvas, which can be further modified based on the user's needs and preferences to generate a customized template 214. For example, a user can add a text or image block to show relevant product information, use the header/link bar or social links block to redirect customers to a certain webpage or add in a product block to drop in a most popular product.

According to some embodiments, a user can create his/her own base template. A saved base template can be used as a starting point for future emails. Furthermore, an email template can be generated either directly in the template editor or by editing saved email templates. Similarly, the user can create his/her own universal component by selecting a portion of the template, e.g., a section or a block. When more than one universal component is created, a folder can be created to store and display these universal components.

Figure 3:
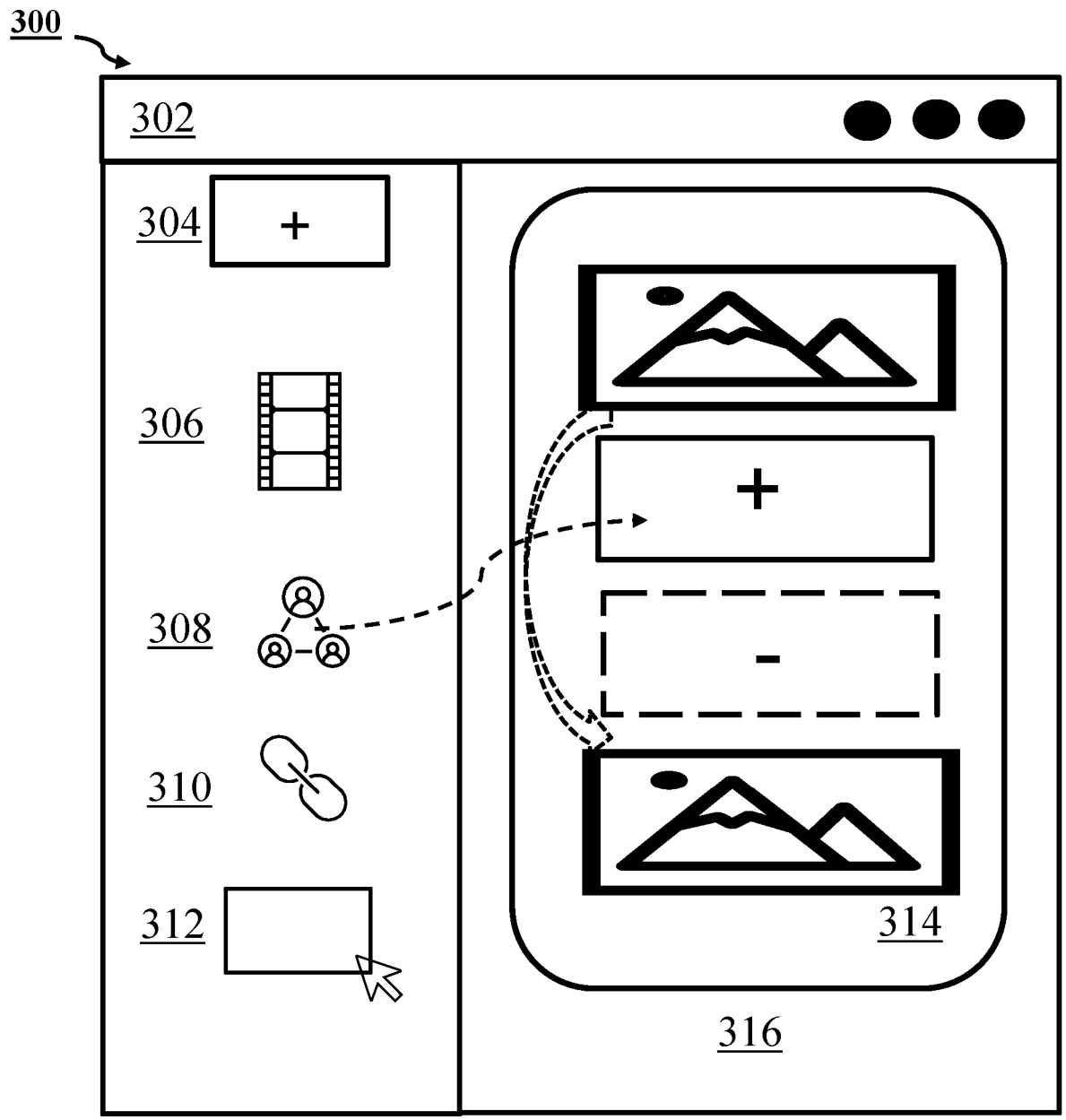
FIG. 3 shows an exemplary interface to edit a base template using a template editor, according to one or more embodiments of the present subject matter.

FIG. 3 shows another exemplary user interface 300 to edit a base template 314 using a template editor 302, according to some implementations of the present subject matter. Following a selection of base template 314 in email canvas 316 as described in FIG. 2, a user can further modify the template using template editor 302.

According to some embodiments, various blocks can be used to generate an email. A block can be a text block, an image block, a button block, a table block, a header/link bar block, a social link block, or any combination thereof. The relevant block data can define the block's various attributes, e.g., content and style. According to some embodiments, these attributes can be adjusted based on a user's preference. For example, a user can change the different visual representations of a block, including borders, colors, padding, margins, text font and weight, etc., by changing the block attributes.

For example, a text block 304 can insert any text into an email template. Text block 304 can allow a user to customize the text in base template 314. According to some embodiments, a user can edit the source or HTML code of text block 304 via directly editing the source file. In addition to the common block style, a user can further change font size, font weight, line height, and background of text block 304.

An image block 306 can insert an image into an email template. Image block 306 can be static or dynamic, such as a video. Various methods can be used to add an image to the image block, including uploading or dragging an image from a user's computer, and inserting an image URL. In addition to the common block style, an image block can have some extra options such as background, border, and padding.

A social link block 308 can add social icons for various social sites such as Facebook, Twitter, Pinterest, etc. When a user selects and drags social link block 308, the system will automatically populate a social icon as a default. For additional social sites, the user can add preferred social sites via a button block.

A header/link bar block 310 can be used to add a logo navigation link that can redirect to the different content of a user's website. According to some embodiments, when a user selects and drags header/link bar block 310, the system can populate several common header/link bar layouts to choose from. After selecting a preferred layout, the user can define the content of the block or adjust its look. According to some embodiments, other types of blocks, such as a table block, product block, columns, etc., can be used to create a customized email by the user.

A button block 312 can create larger links that are more obvious and are used for calls to action (CTAs). An example of a button block is for "Make Your Purchase." The attributes, i.e., text and style, of a button block can be edited by the user. As shown in FIG. 3, a user can adjust a block's position within base template 314. For example, by dragging a selected image block to the lower bottom of base template 314. Such position data can be saved in the data table associated with the block.

Figure 4A:
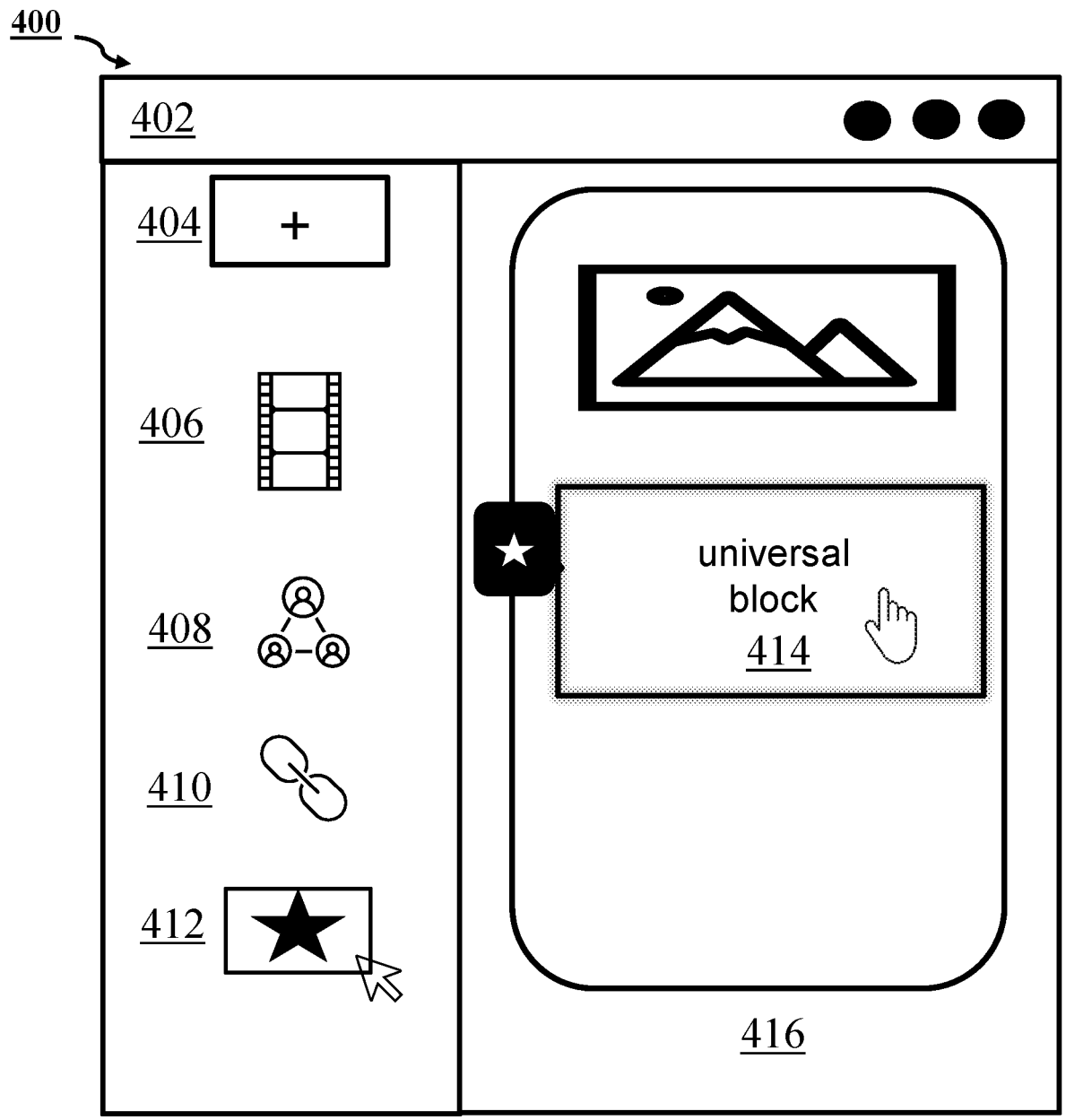
FIG. 4A shows an exemplary interface to create a universal component using a template editor, according to some implementations of the present subject matter.

FIG. 4A shows an exemplary interface 400 to create a universal component or content using a template editor 402, according to some implementations of the present subject matter. As shown in FIG. 4, template editor 402 can comprise various blocks, such as text block 404, image block 406, social link block 408, and header/link bar block 410, for generating an email template. According to some embodiments, the user can convert any block into a universal block 414 by hovering over it to initiate the process. Upon detection a user's interest by highlighting a block, the system can display a universal block indicator, e.g., a star, next to the selected block. The user can click the universal block indicator to confirm that the selected block shall be saved as a universal block. Accordingly, the saved universal block 414 can be shown as an archived universal block 412 in the template editor 402. The system can save component data of the universal block or component, which comprises various component attributes that define the content and format of the universal component. According to some embodiments, the system can assign a distinct object identifier (OID) to uniquely identify the component data in the corresponding data table. According to some embodiments, when more than on universal block are created, the archived universal block 412 can be a folder that stores multiple blocks. In addition, the universal component of the present subject matter can comprise multiple grouped blocks, such as a section.

When the user plans to reuse the archived universal block 412, he/she can select the archived universal block 412 and drag it to any position within canvas 416. The template management system can establish a relationship between the target template and the archived universal block 412, for example, by generating an embedded pointer directing to the universal block data. Furthermore, the system can receive position data of the archived universal block 412 within the template and display the block at the selected position. According to some embodiments, the archived universal block 412 can be used for multiple times in one template or be adopted by different templates. As such, the universal block 414 can be repeatedly used without making a duplicate copy of the block.

Figure 4B:
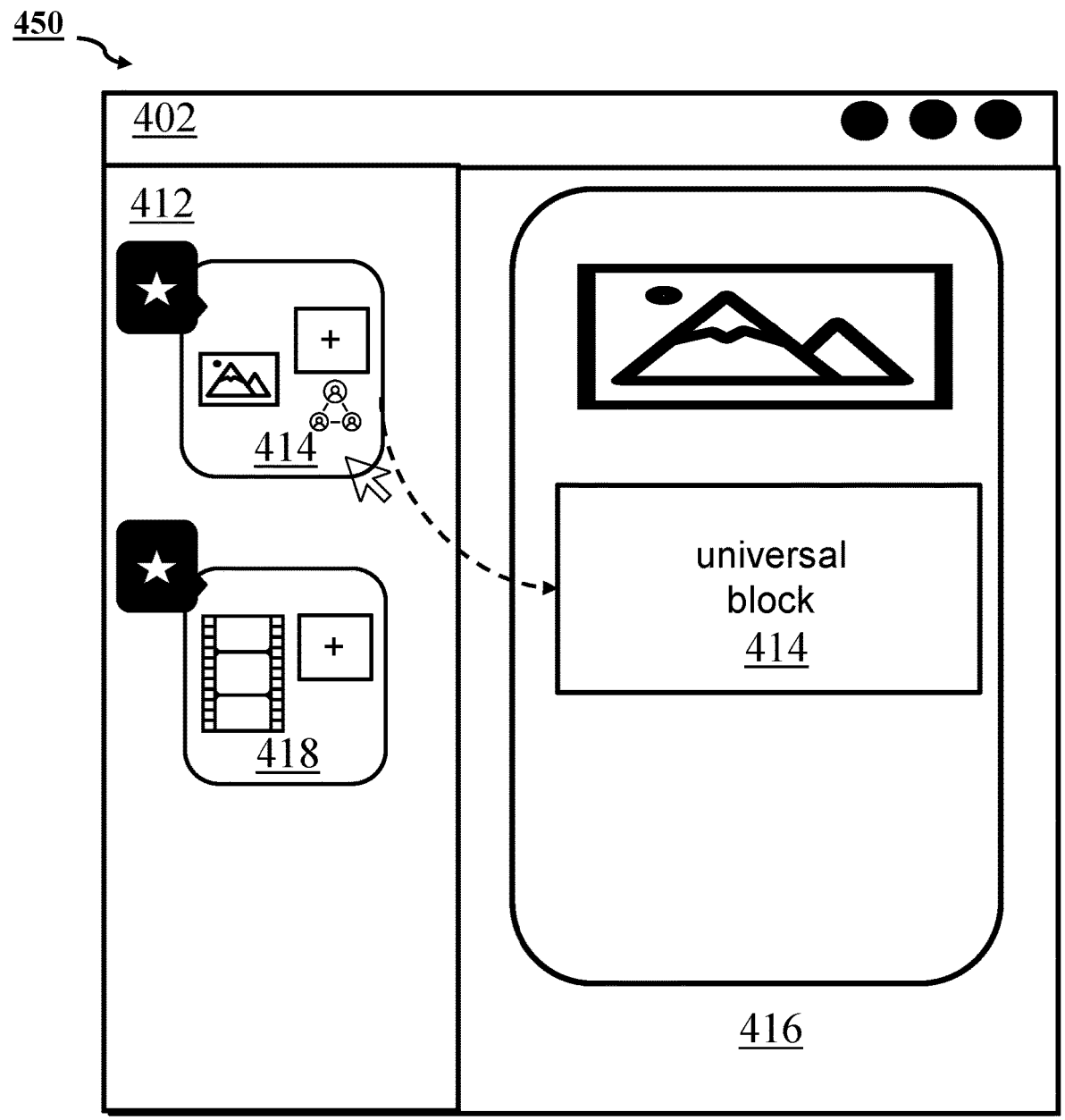
FIG. 4B shows an exemplary interface to use a universal component using a template editor, according to some implementations of the present subject matter.

FIG. 4B shows an exemplary interface 450 to use a universal component using a template editor 402, according to some implementations of the present subject matter. As shown in FIG. 4B, the archived universal block(s) 412 can be displayed under a "universal block" tab that comprises one or more saved universal blocks, e.g., universal blocks 414 and 418. When the user plans to reuse a universal block 414, he/she can select the archived universal block 414 and drag it to any position within canvas 416. The template management system can establish a relationship between the target template and the selected universal block 414, for example, by generating an embedded pointer directing to the universal block data.

FIG. 5 shows exemplary hierarchical components of a template 500. A template can be stored in a relational database via normalized and related data components, such as body, sections, rows, columns, blocks and sub-blocks. The template data can be normalized and nested tables comprising components/blocks, settings/content, and position information for the template.

When being rendered as an email, relevant data of the template can be converted into a computer-compiled HTML web page showing the embedded components, such as sections and blocks. According to some embodiments, a component is a pre-defined structure that can be represented in both the relational database and in the email editor, and which can be rendered into HTML and configured by its display settings and sub-components as well as its content. According to some embodiments, the template data can be rendered as an email template in the JSON data structure that can be configured or modified by a computing device or a client device.

As illustrated in FIG. 5, an email template 500 can comprise hierarchical components or nodes in a relational database. For example, a first-level component can be a body 502, which can comprise sections 504 as second-level components. Sections 504 can further comprise rows 506 as third-level components. Furthermore, rows 506 can comprise columns 508 as a fourth-level component. Columns 508 can comprise blocks 510 as fifth-level components, which can further comprise subblocks 512 as sixth-level components. At each level, one or more components can depend on the previous-level component(s).

According to some embodiments, the relational database can be a MySQL™ database or any relational database. Each component of the template can correspond to one or more related tables, which define the structure and content of the component, as well as its relationship with other components.

According to some embodiments, the universal component of the present subject matter can be a section that comprises sub-components such as rows, columns, blocks and subblocks. According to some embodiments, the universal component can be a block that comprises subblocks.

Figure 6A:
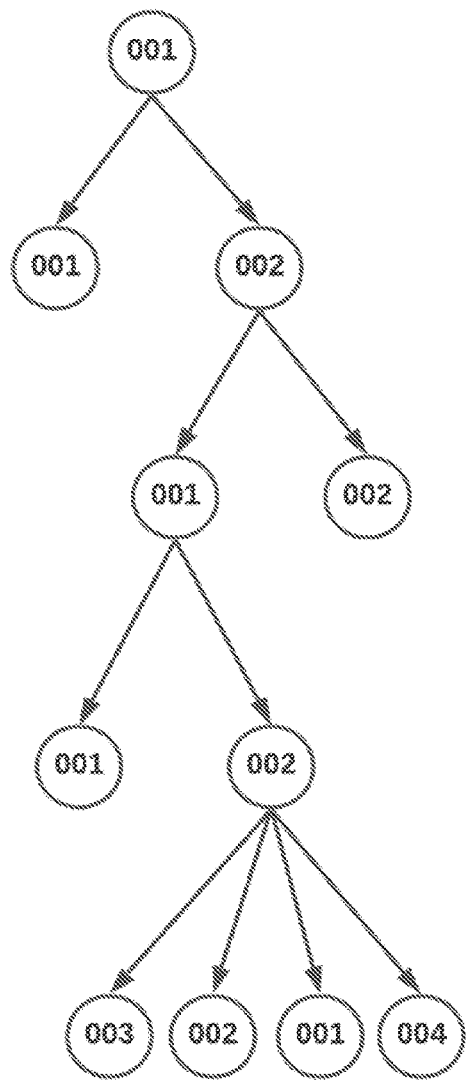
FIG. 6A shows an exemplary representation of a template, according to one or more embodiments of the present subject matter.

FIG. 6A shows an exemplary anatomy 610 of a template 600 and FIG. 6B shows the template stored in a relational database. As shown in FIG. 6A, template 600 can comprise a number of components or nodes, including a body 001 that further comprises a section 001 and a section 002. Section 002 can comprise a row 001 and a row 002. Row 001 can further comprise a column 001 and a column 002, which comprise four blocks 003, 002, 001 and 004, respectively. According to some embodiments, either a section or a block of template 600 can be designated as a universal component.

FIG. 6B is the relational database 620 of the template 600 as shown in FIG. 6A. As shown in this figure, the relational database 620 of the template 600 can comprise a number of related normalized data tables, including body table 602, section table 604, row table 606, column table 606 and block table 608. For example, body table 602 has an ID 001 and its corresponding settings, which can define the color, size, font, and content of the body. Body table 602 can be related to section table 604 that can comprise section 001 and section 002. Each of these sections can have its respective settings and position within body 001, i.e., position 0 and position 1. Similarly, section 002 can comprise row 001 and row 002, each of which has its respective settings and positions within section 002. Row 001 can comprise columns 001 and 002 with its respective settings and positions within the row. In addition, column 002 can comprise four individual blocks 001, 002, 003 and 004, which are located in its corresponding position 2, 1, 0 and 3.

According to some embodiments, when a universal block, e.g., block table 608, is selected and created, the system can save the corresponding block table for later retrieving. According to some embodiments, the system can assign an OID to uniquely identify the corresponding block table. When an archived universal block is requested, either by the same template 600 or a different template, the system can use a pointer directing to block table 608, which can enable immediate and direct access of the block data.

Figure 7:
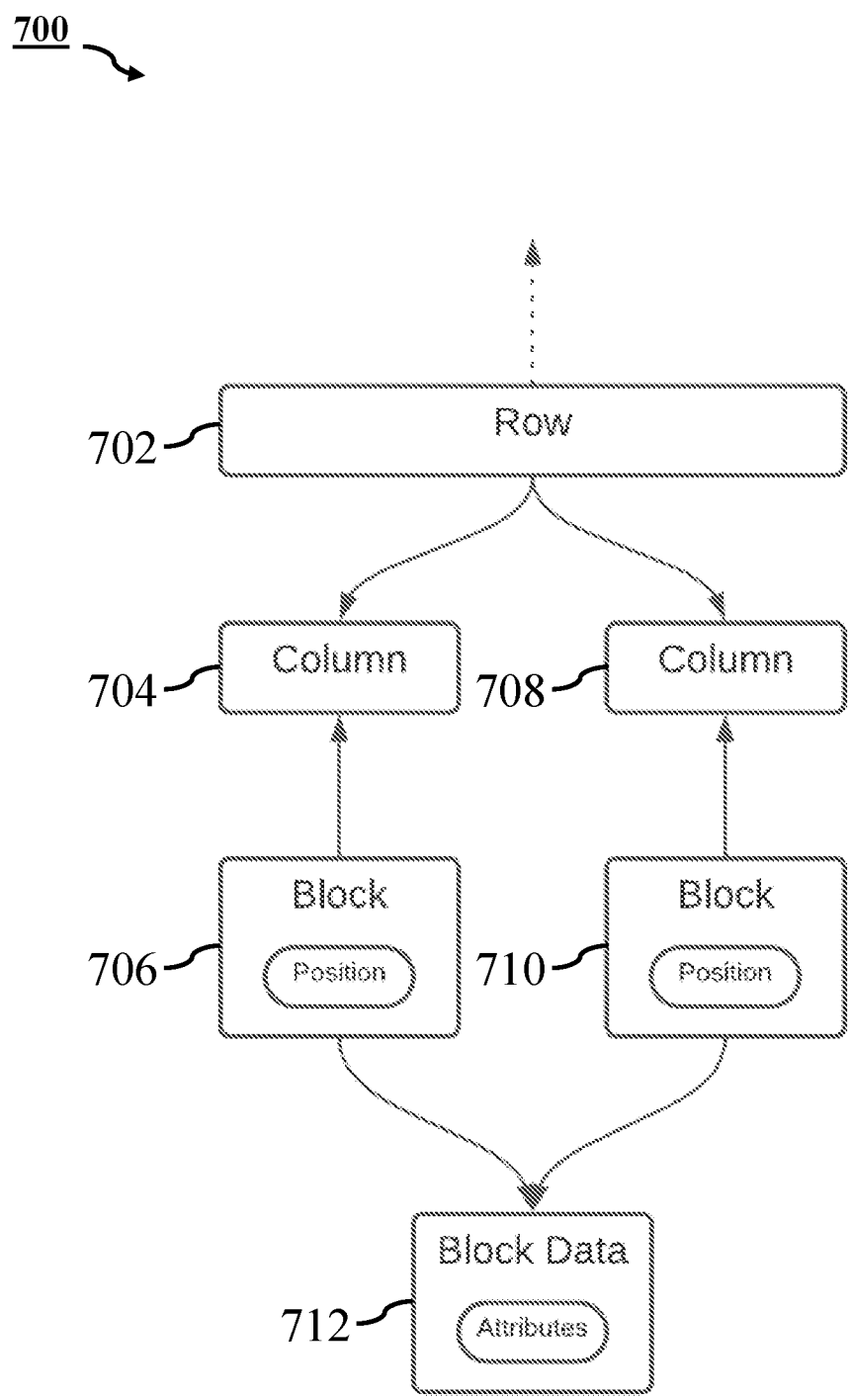
FIG. 7 shows an exemplary diagram of a template with different blocks sharing a universal component, according to one or more embodiments of the present subject matter.

FIG. 7 shows an exemplary diagram 700 of a template with different blocks sharing a universal component, according to one or more embodiments of the present subject matter. As shown in FIG. 7, the template can comprise a row 702 with two columns 704 and 708 at two positions. Column 704 can comprise a universal block 706 at position "0", whereas column 708 can comprise a same universal block 710 at position "1". Despite their different positions, the universal block 706 and 710 have the same content and style as they the same block data 712. As described herein, the system can retrieve the shared block data 712 of the universal block via the respective pointers and display it at the designated position. The block data 712 can comprise various component attributes that define the content and format of the universal component, e.g., the text, image, font size, and/or colors.

Figure 8:
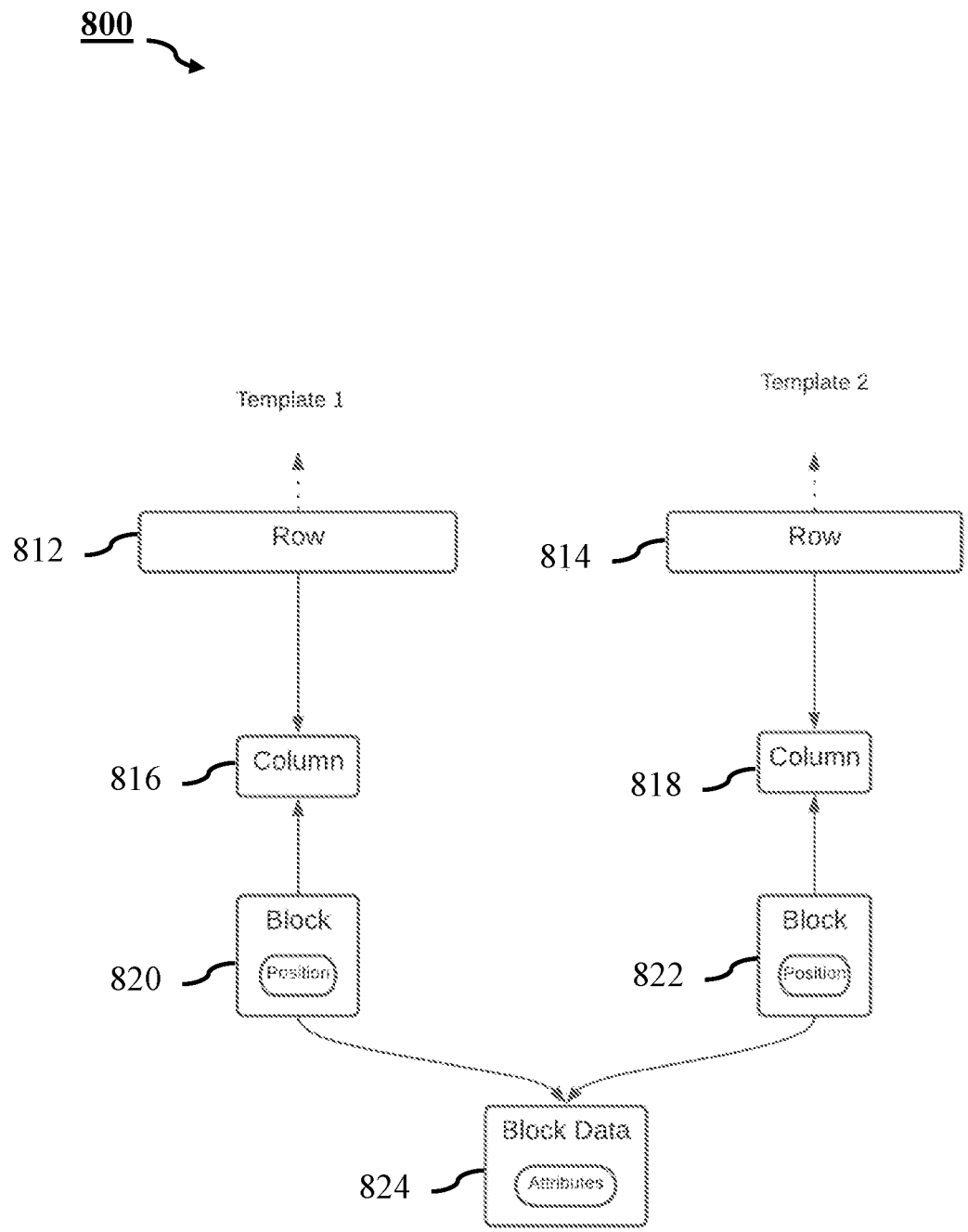
FIG. 8 shows an exemplary diagram of multiple templates sharing a universal component, according to one or more embodiments of the present subject matter.

FIG. 8 shows an exemplary diagram 800 of multiple templates sharing a universal component, according to one or more embodiments of the present subject matter. As shown in FIG. 8, template 1 can comprise a row 812 with a column 816. Column 816 can comprise a universal block 820 at a selected position. The system can retrieve the block data 824 of the universal block via a first pointer. Meanwhile, template 2 can comprise a row 814 with a column 818. Column 818 can comprise the same universal block 822 at a selected position. Accordingly, the system can retrieve the same block data 824 via a second pointer. As such, the universal block 820 and 822 have the same content and style as they share block data 824. Furthermore, according to some embodiments, any modification of block data 824, either through template 1 or template 2, can be immediately reflected in both templates.

Figure 9:
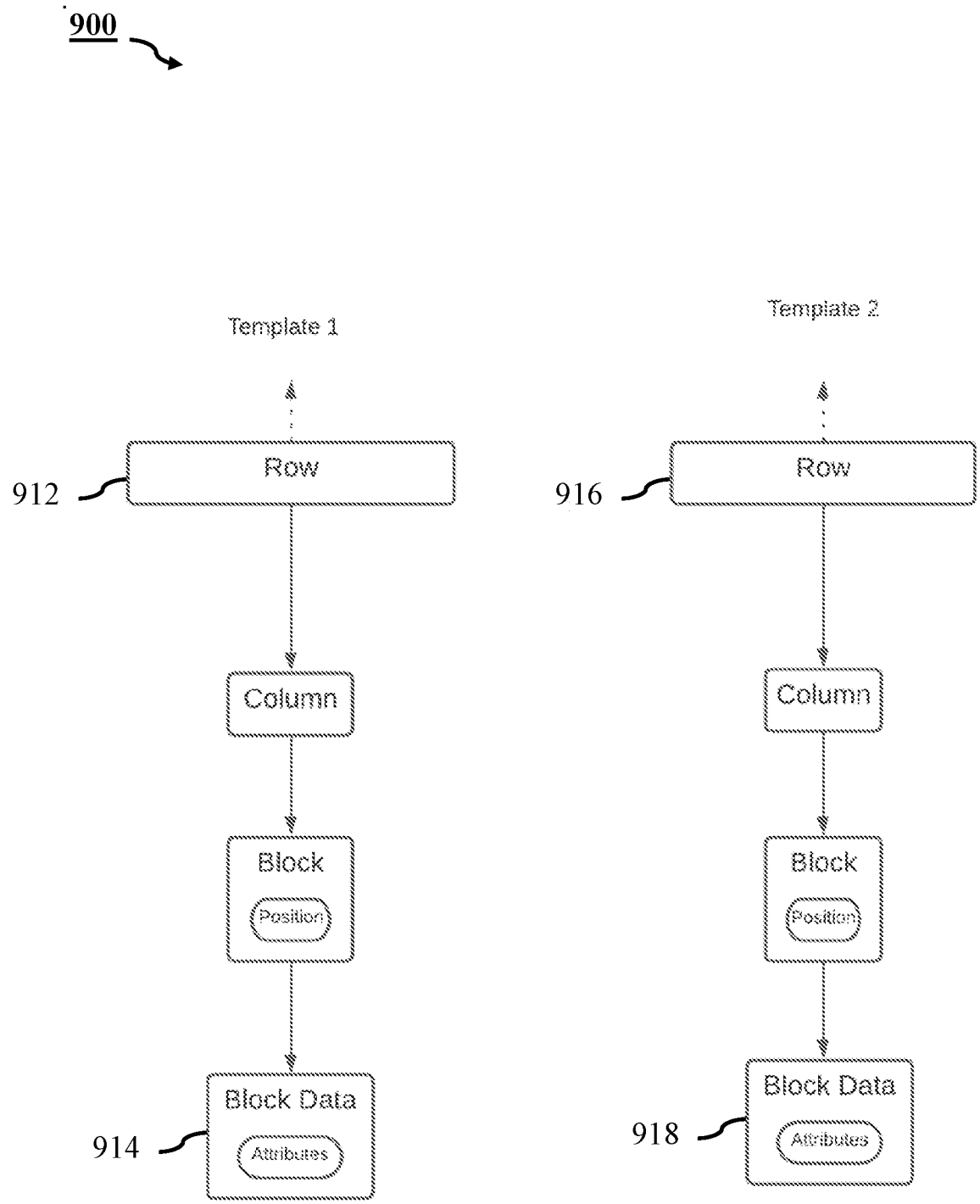
FIG. 9 shows an exemplary diagram of disconnecting a template from a shared universal component, according to one or more embodiments of the present subject matter.

FIG. 9 shows an exemplary diagram 900 of disconnecting a template from a shared universal component. According to some embodiments, the system can enable a template to disconnect from a related universal component. Following the diagram 800 in FIG. 8, a user can change the block data 824, e.g., a different text font size, through template 1. Before saving the changes, the system can prompt the user to select whether to implement the changes to all templates that have adopted the same universal block. For example, the system can request whether to implement the changes to template 2. When the user selects not to implement the changes to other template 2, the system adopts the flow diagrams as shown in FIG. 9.

As shown in this figure, the system can make a dedicated copy of the original universal block data and associated it with the disconnected template. These dedicated component data is independent from the shared universal block data so that further modification on the shared data does not impact the dedicated copy. In the present example, when the user selects not to implement the changes via template 1 to template 2, the system makes a copy of the original block data 914, which is the dedicated block data 918, for template 2. As a result, template 1 can have row 912, column, block and its original block data 914. Template 2 can have row 916, column, block and its dedicated block data 918.

Figure 10:
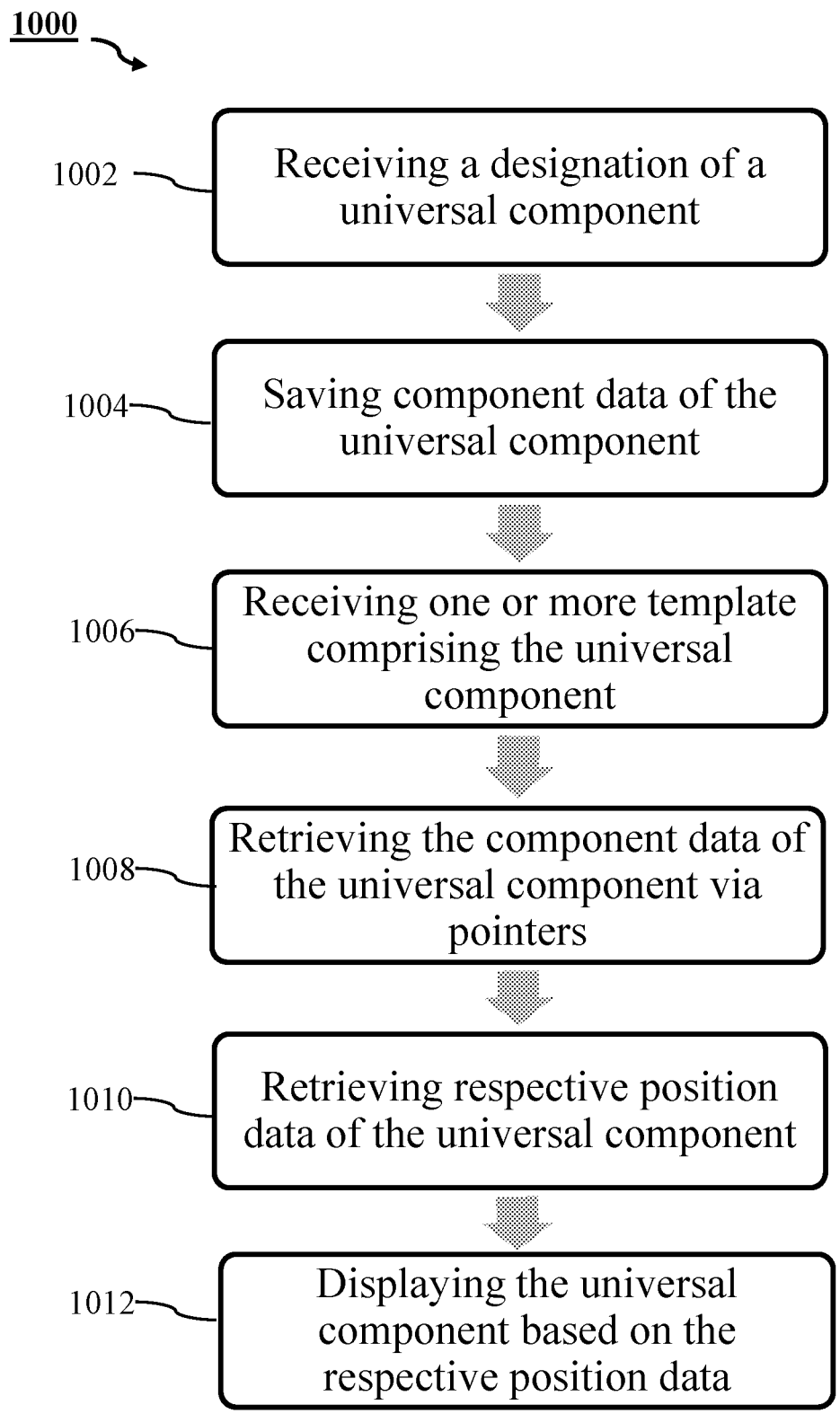
FIG. 10 shows an exemplary process of template management with universal components, according to one or more embodiments of the present subject matter.

FIG. 10 shows an exemplary process 1000 of template management with universal components, according to one or more embodiments of the present subject matter. At step 1002, the template management system can receive a designation of a universal component in a template. The template can be an HTML email template with structures and components that can be modified by a computing device or a client device. According to some embodiments, a database schema can define how data of a template email is organized within a relational database. Such database schema can comprise various logical constraints such as, component names, fields, data types, and the relationships between these entities.

According to some embodiments, the template can comprise a few components, such as body, sections, rows, columns, blocks, and subblocks. The template, with its data schemas that define the structure and content of it, can be stored in a relational database, e.g., the MySQL database. According to some embodiments, the email template can be marketing emails that can directly deliver relevant content to a customer. Furthermore, a universal component can comprise grouped components such as a section, or an individual component such as a block.

At step 1004, the system can save the component data of the universal component. The component data can comprise various component attributes that define the content and format of the universal component. According to some embodiments, the system can assign a distinct object identifier to uniquely identify the component data in the corresponding data table. An object identifier can be a string of decimal numbers that uniquely identifies an object. Furthermore, the component data can comprise various component attributes that define the content and format of the universal component, e.g., the text, image, font size, and/or colors.

At step 1006, the system can receive one or more template comprising the universal component. The universal component can be repeated within one template or across different templates. According to some embodiments, the user can select an archived universal component in a template editor and place it at a designated position within a template.

At step 1008, the system can retrieve the component data of the universal component via pointers directing to the universal component data. As shown in FIG. 7, column 704 and column 708 within one template can each be associated with a respective pointer to direct to the same universal component data 712. As shown in FIG. 8, template 1 and template 2 can share the same universal component data 824 via its respective pointer.

At step 1010, the system can retrieve respective position data of the universal component. The respective position data can indicate a position of the universal component within the target template. At step 1012, the system can display the universal component within the target template at the designated position based on the corresponding position data.

FIGS. 11-16 describe embodiments including systems, methods, and apparatuses for template serialization for pre-rendering and versioning.

Template Serialization decreases load on the database by combining related entities into a single entity, thus speeding up retrieval. Template rendering benefits from the serialized structure to result in faster renders, known as pre-rendering. Template versioning is a system that preserves previous edits to templates, enabling users to restore previous versions if and when the user see fit.

Figure 11:
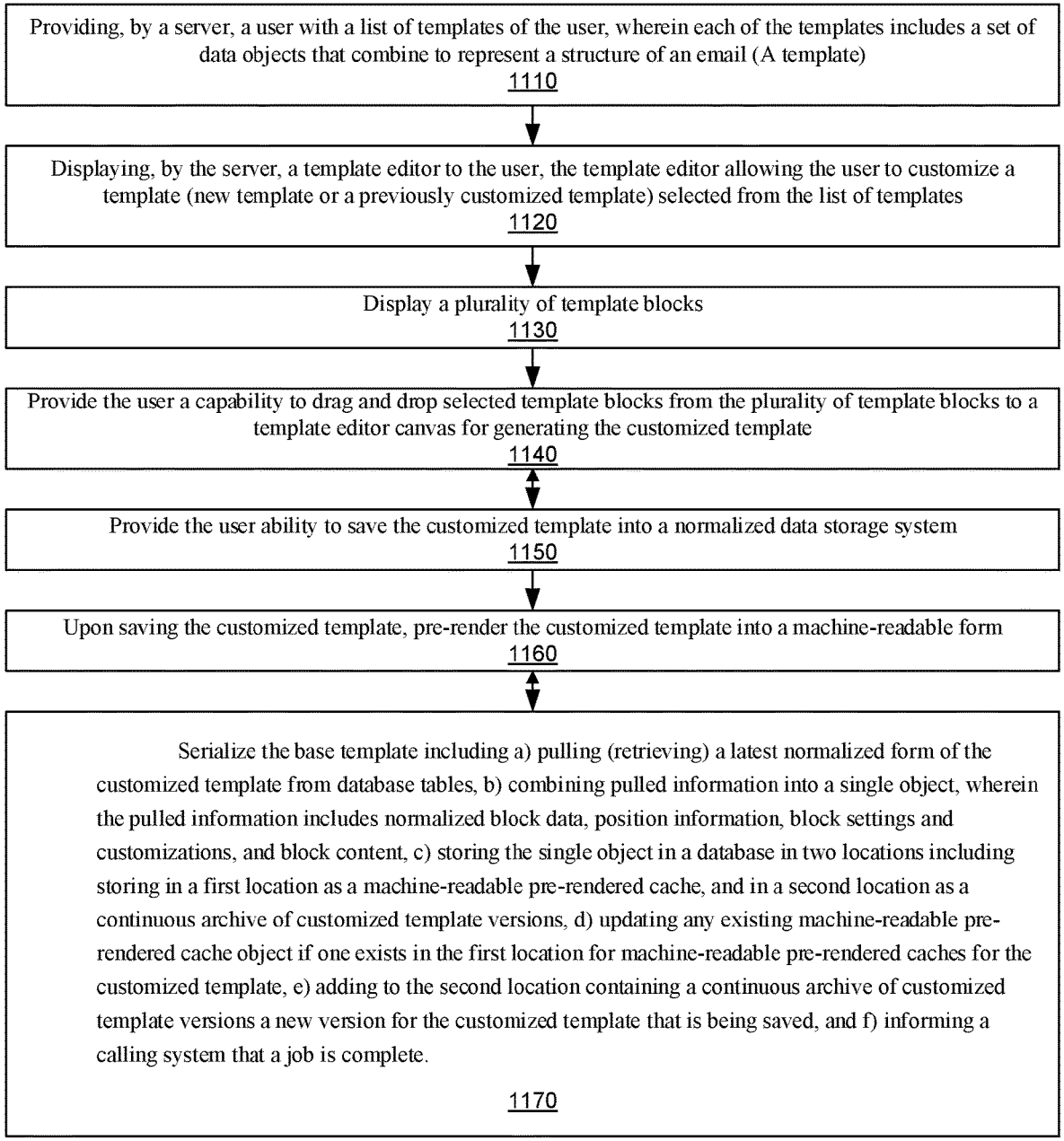
FIG. 11 shows an exemplary flow chart that includes steps of a method of template serialization for pre-rendering and versioning, according to an embodiment.

FIG. 11 is a flow chart that includes steps of a method of template serialization for pre-rendering and versioning, according to an embodiment. A first step 1110 includes providing, by a server, a user with a list of templates of the user, wherein each of the templates includes a set of data objects that combine to represent a structure of an email. A second step 1120 includes displaying, by the server, a template editor to the user, the template editor allowing the user to customize a template (new template or a previously customized template) selected from the list of templates. For at least some embodiments, the template editor operates to (step 1130) display a plurality of template blocks, (step 1140) provide the user a capability select (for example, to drag and drop) template blocks from the plurality of template blocks to place on a template editor canvas for generating the customized template, (step 1150) provide the user ability to save the customized template into a normalized data storage system, and (step 1160) upon saving (this relates to triggering the save as shown and described by FIG. 12) the customized template, pre-render the customized template into a machine-readable form.

The method further includes a step 1170 of serializing the customized template. For an embodiment, serializing the customized template includes a) pulling (retrieving, or querying the database tables to retrieve blocks, settings, content, and position information for the customized template) a latest normalized form of the customized template from database tables, b) combining pulled information into a single object, wherein the pulled information includes normalized block data (block data includes the types of blocks being added to the customized template, as well as their sub-blocks), position information (position information includes the location within the customized template of the blocks and their sub-blocks), block settings and customizations (block settings and customizations include display configuration parameters including font size, font family, margins, paddings, colors, block parameters including number of rows and columns in a table, image URLs, mobile and/or desktop display toggles, and other settings including block-type specific settings such as product feed information for product blocks and selected products for catalog layouts of product blocks and product block layout orientations, among several other configuration parameters across various blocks), and block content (wherein block content can include text created via an optional WYSIWYG (what you see is what you get) text editor with common text editing controls, and also block content can include images, and in some cases block content can also include other blocks), c) storing the single object in a database in two locations including storing in a first location as a machine-readable pre-rendered cache (including of a serialized object that contains all normalized sub-objects, positional information, display settings customizations, and block content), and in a second location as a continuous archive of customized template versions (wherein the customized template versions are also machine-readable serialized objects containing all the data of the machine-readable pre-rendered cache as well as timestamp and version identification which serves to facilitate customized template version restoration and customized template version selection by a user at a later date), d) updating any existing machine-readable pre-rendered cache object if one exists in the first location for machine-readable pre-rendered caches for the customized template, e) adding to the second location containing a continuous archive of customized template versions a new version for the customized template that is being saved, and f) informing a calling system (wherein the calling system is represented in 1235 in FIG. 12 and is a system for queueing serialization of a customized template (a job) and polling for completion of the job) that a job (a job is a queued request to trigger serialization of the customized template) is complete.

The described embodiments are unique due to the normalized and serialized systems being combined with the block types, their settings, and the system around managing versions and serialization jobs. A block is a pre-defined structure that can be represented in both a database and in the email editor, and which can be rendered into HTML and configured by its display settings and sub-blocks as well as its content to produce unique HTML when rendered. A sub-block is a block-type designed to be located within another block of a specific type; for example, a table block can be a sub-block of a section block, and a table image or table text block (or table header or other table-related blocks) can be sub-blocks of a table block. Similarly, a product block can have specific product sub-blocks where the containing product block is responsible for layout and general configuration but the sub-product blocks are responsible for the display of specific user products as stored in the system.

At least some embodiments further include template version restoration. For an embodiment, template restoration includes (and represented in FIG. 13) displaying, by the server, the list of templates to the user enabling the user to view a list of versions for any given template enabling the user to select a previous version for restoration restoring the previous template version, including pulling a serialized template version from the second location in the database, parsing the serialized template version into normalized form compatible with a normalized table structure in the database (represented in FIG. 15), replacing existing data in the normalized table structure (which represents the customized template) with a normalized form of the restored template version (restored by parsing the serialized template version) representation, and allowing the user to interact with the restored template version as if the restored template version was the customized template.

Figure 12:
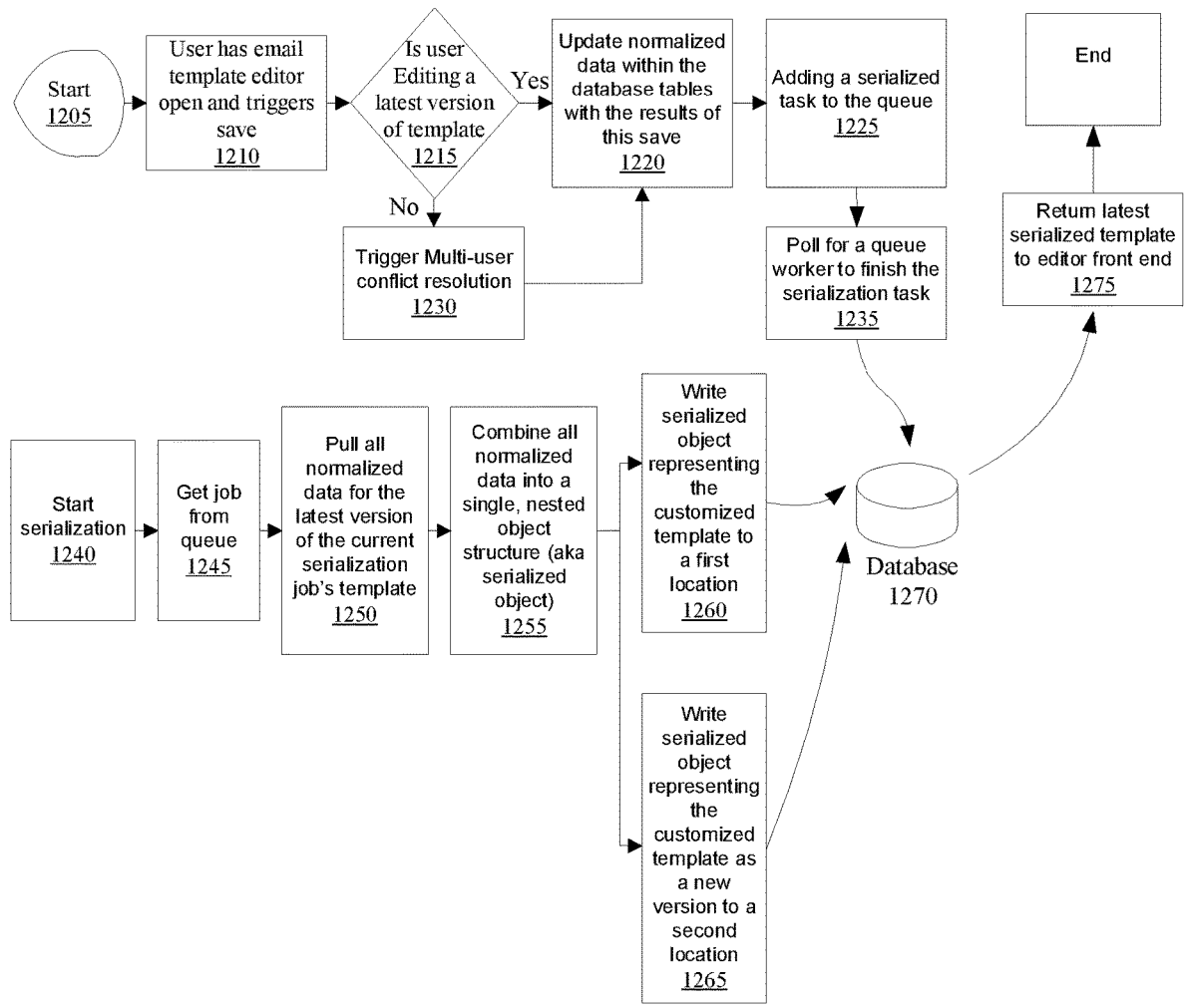
FIG. 12 shows an exemplary flow chart that includes steps of a method of template serialization for pre-rendering and versioning, according to another embodiment.

FIG. 12 is a flow chart that includes steps of a method of template serialization for pre-rendering and versioning, according to another embodiment. After starting 1205, a first step 1210 includes identifying a user has the email editor open and a save has been triggered (for an embodiment, a save is triggered when a user moves, creates, or deletes a block. For other embodiments a save is also triggered when a user makes an edit inside a block AND ALSO either clicks off the block onto another block or clicks "done" in the block settings or tries to leave or navigate away from the editor). A second step 1215 includes determining whether the user is editing a latest version of a template (multi-user conflict resolution involving conflict ID tracking, incrementing, and enabling multiple users to edit the same customized template). If the customized template is the latest version, a third step 1220 includes updating normalized data within database tables with the new data represented within the editor as a result of the user's changes to the customized template which triggered the save. A fourth step 1225 involves adding a serialization task (a job) to the queue. A fifth step 1235 includes polling for a queue worker to finish the serialization task (when the queue worker completes the job it will notify the calling system that the job is complete and the calling system retrieves the notice by querying the database at a fixed interval looking for the notice until the notice is received).

If the result of determining whether the user is editing a latest version of a template is no, a fifth step 1230 includes triggering multi-user conflict resolution. After the multi-user conflict resolution has been triggered, the third step 1220 is executed.

Further, as shown, serialization may be started from a queued job by a queue worker (fifth step 1240), which further includes a sixth step 1245 that includes getting a serialization job (a serialization task which includes information specifying which customized template to serialize) from the queue (a system designed to hold jobs in sequential order for processing by a queue worker). A seventh step 1250 includes pulling all normalized data for the latest version of the customized template of the serialization job. An eighth step 1255 includes combining all normalized data into a single, nested object structure (also known as serialized object) representing the customized template. A ninth step 1260 includes writing the serialized object representing the customized template to the first location where we store machine-readable pre-rendered caches, and a tenth step 1265 includes writing the serialized object representing the customized template as a new version to the second location for storing a continuous archive of customized template versions in the database 1270.

From the database 1270, an eleventh step 1275 includes returning the latest serialized template to the editor front end for the user.

Figure 13:
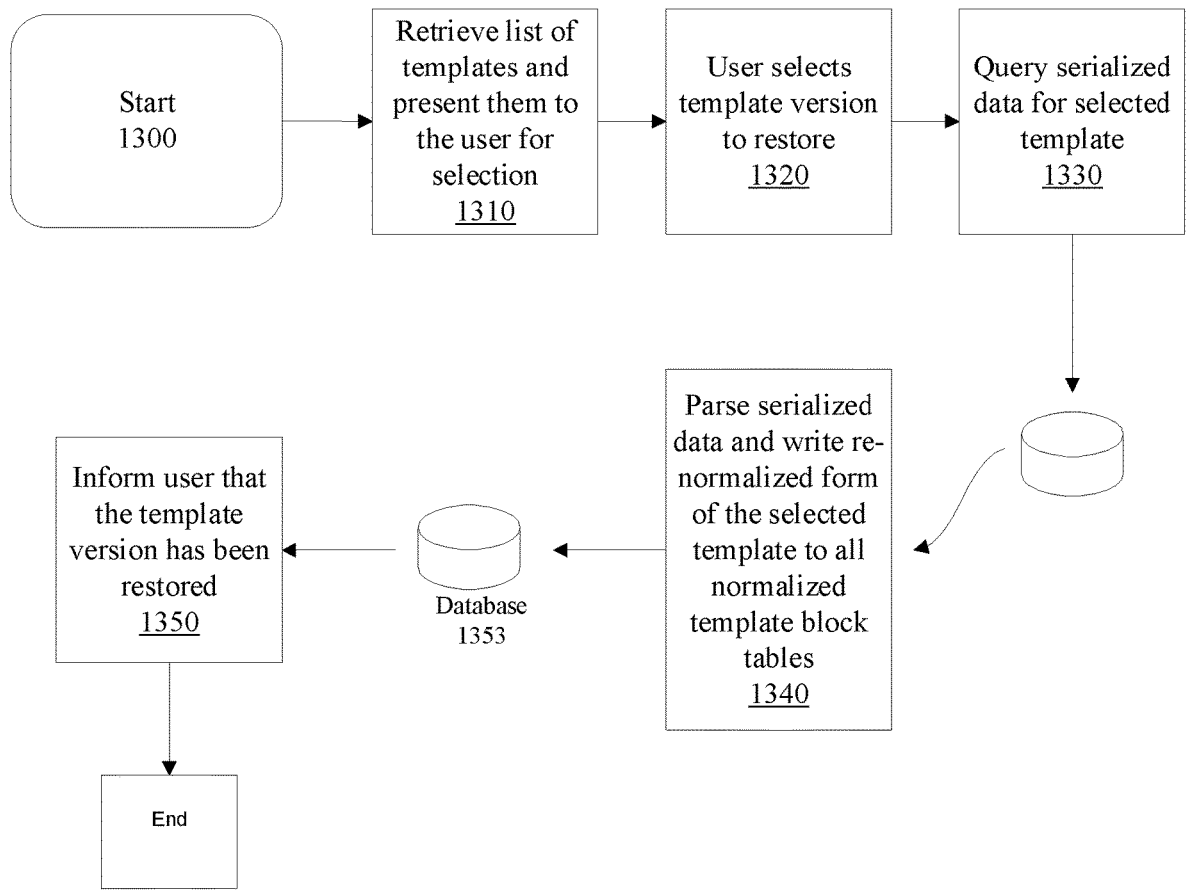
FIG. 13 shows an exemplary flow chart that includes steps of template version restoration, according to another embodiment.

FIG. 13 is a flow chart that includes steps of template version restoration, according to another embodiment. After starting 1300, a first step 1310 includes retrieving a list of templates and presenting the retrieved templates to the user for selection. A second step 1320 includes the user selecting a template version to restore. A third step 1330 includes querying the serialized object for the selected template version from a database 1351.

Figure 15:
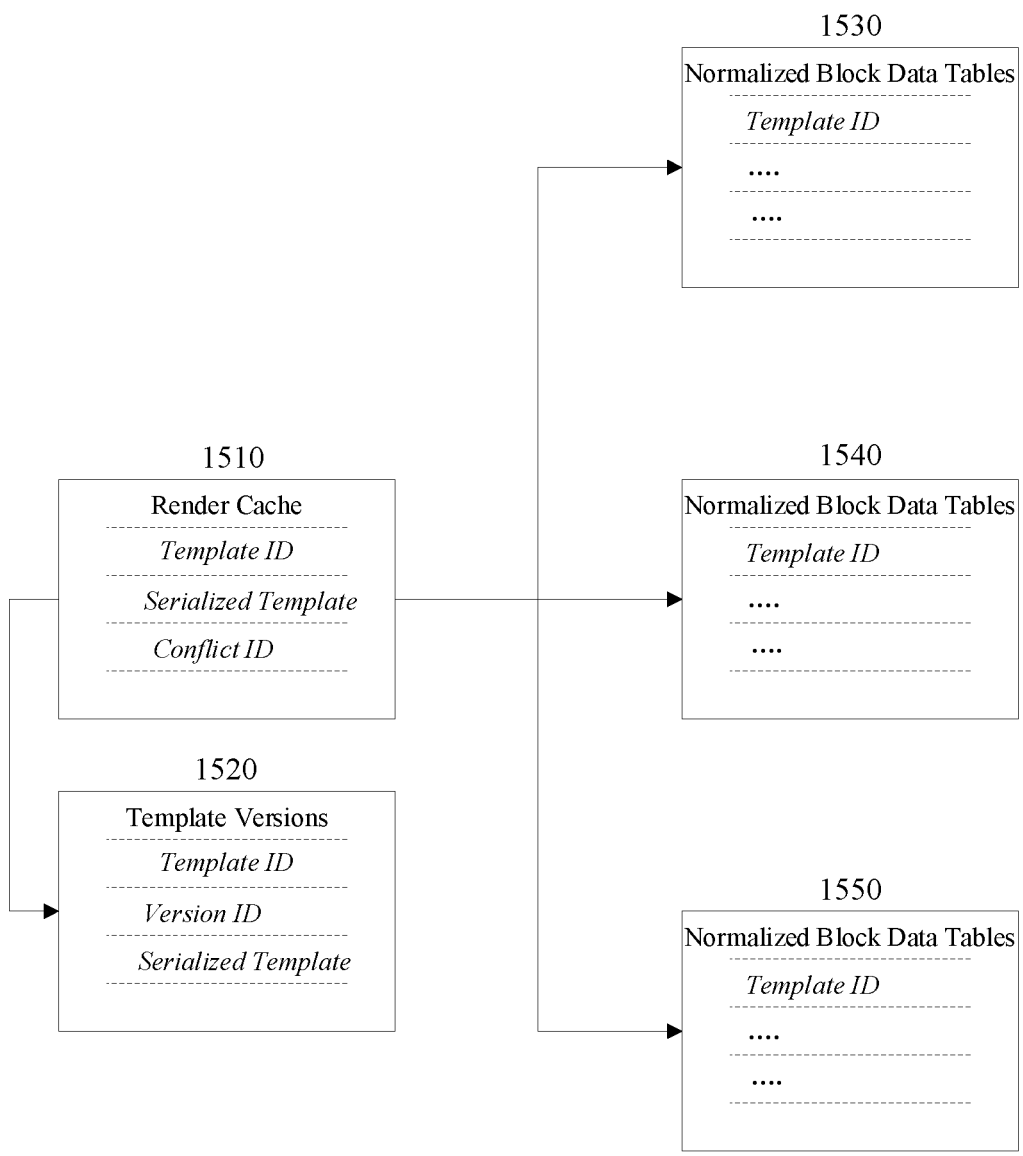
FIG. 15 shows an exemplary data model of normalized templates, serialized templates, and template versions, according to an embodiment.

From the database 1351, a fourth step 1340 includes parsing the serialized object back into a renormalized form (consisting of individual blocks, subblocks, block content, block and template settings, positions, etc.) and writing the renormalized form of the selected template version to all normalized template block tables (as represented in FIG. 15 consisting of several individual tables for blocks, sub blocks, settings, etc.) to a database 1353.

A fifth step 1350 includes informing the user that the template version has been restored.

Figure 14:
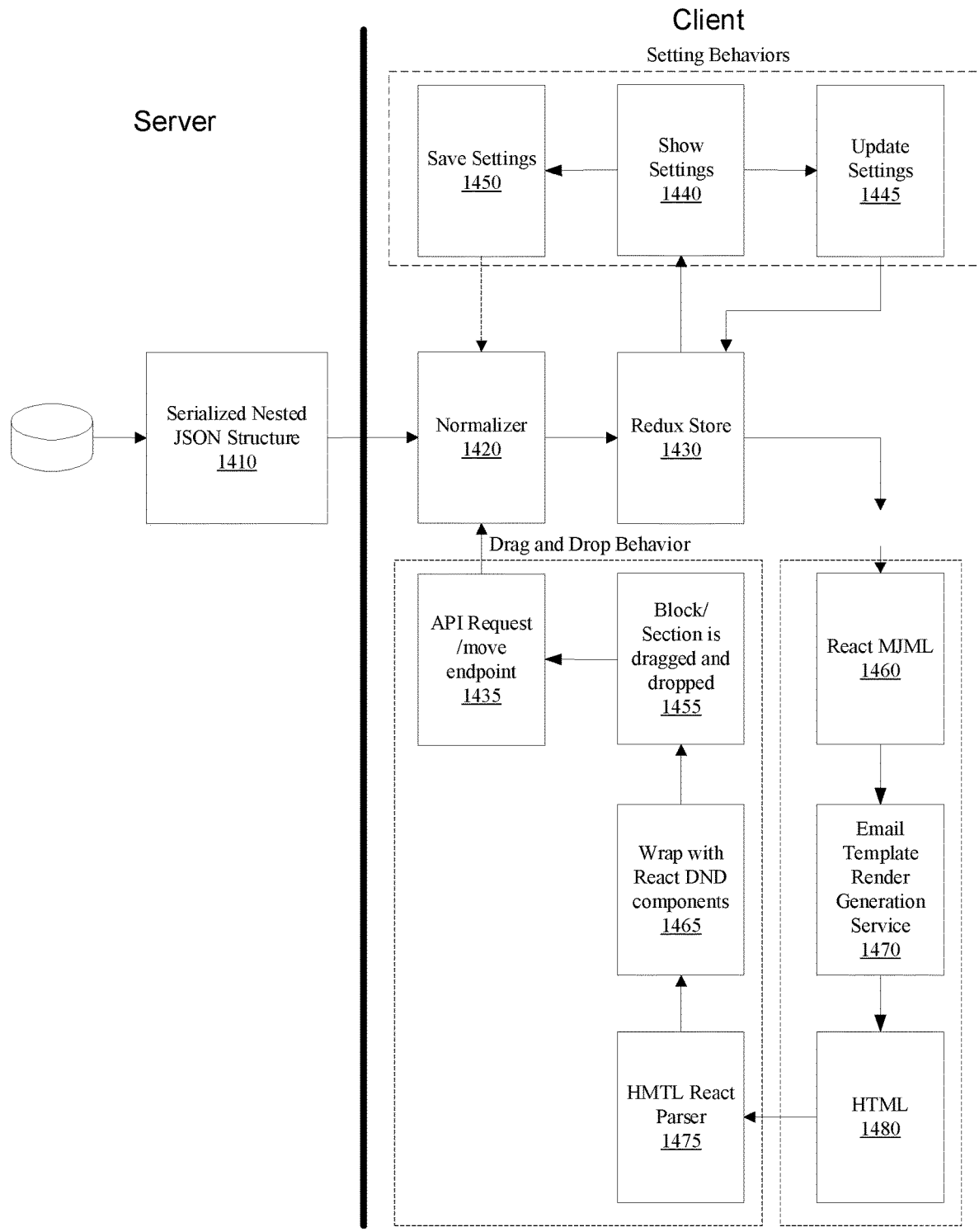
FIG. 14 shows an exemplary block diagram of client-server relations around using serialized templates, according to an embodiment.

FIG. 14 shows a block diagram of client-server relations around using serialized templates, according to an embodiment. A first step 1410 includes retrieving, by a server, a serialized nested JSON structure which contains the normalized form of the current customized template consisting of nested blocks, sub blocks, settings, positions, etc., wherein JSON (JavaScript® Object Notation) is a format that encodes objects in a string. Serialization, in this context, means to convert an object into that string, and the Normalizer in step 1420 performs deserialization which is the inverse operation of serialization and converts the string to a normalized object in the memory of the client browser.

A redux store 1430 of the client stores the normalized object within the client browser's memory in a way that facilitates access through the Redux API documented here (https://redux.js.org/api/api-reference).

As a part of setting behaviors, show settings 1440 includes displaying in the user interface various settings for each block including font, color, sizing, spacing, and block specific settings like image selection and upload, etc.

Saving the settings 1450 is a process in which the template data including blocks, sub blocks, settings, etc. are sent to the server to be stored in a database.

Updating the settings 1445 is a process in which the editor is updated with the new rendering of blocks wherein the new settings selections have been applied to adjust their font, color, sizing, spacing, etc.

As a part of canvas rending of the client (where a customized template is displayed within a browser window on the client machine) includes a MJML (Mail Jet Markup Language) block 1460 where MJML is a framework for creating Responsive (i.e. desktop client and mobile client compatible) Email Templates and supports JavaScript®-powered customization of blocks which render into HTML and the MJML can be accessed via React wrapper functions which make it easier to build an editor UI around the MJML blocks.

Email template render generation service 1470 includes a database model representing the email templates which get serialized into JSON which is in the MJML json format. This MJML Json is then sent to the MJML service which returns pre-rendered HTML templates. This HTML template is then passed through Django® (Django® is a Python® framework for building web applications) rendering which fills in all the place holders like company addresses, persons first name, product feed, etc. (dynamic data). Then, this HTML is further processed to optimize it for email clients (like in lining CSS, adding link tracking) and then the final output is sent to an email dispatch service (i.e. sendgrid).

HTML (Hypertext Markup Language) 1480 is a way to represent the structure of a webpage with text.

As a part of Drag a drop behavior of the client includes adding annotations on the frontend to the MJML Json for each block and the frontend then wraps these blocks in containers which mark them as draggable and droppable regions. An embodiment includes using an open-source library react-drag-and-drop.

HTML react parser 1475 takes in the MJML JSON and parses it to React HTML for displaying in the client browser.

Wrap and DND components 1465.

Block/Selection is dragged and dropped 1455 by the user.

API (Application Programming Interface) 1435

FIG. 15 shows a data model of normalized templates, serialized templates, and template versions, according to an embodiment. For an embodiment, the templates include render cache 1510 where the pre-rendered machine-readable serialized form of the customized template is stored. For an embodiment, this is the previously described first location. For an embodiment, the render cache includes a template id corresponding to the customized template stored in the render cache. This template id links the render cache serialized object to the normalized template data in 1530, 1540, 1550, as well as to the template version table in 1520. For an embodiment, the template versions 1520 include the previously described second location and contains several records corresponding to different template versions each containing a serialized object representing the state of a customized template at that version and where the customized template is identified by the template id which maps through the render cache to the current normalized representation. This mapping through the render cache from the template version table is useful for template version restoration. The normalized block data tables 1530, 1540, 1550 are representative of a top-level view on a nested hierarchical data structure which represents template blocks, block settings, template settings, sections, rows, sub blocks, block content, and other data corresponding to a customized template.

Figure 16:
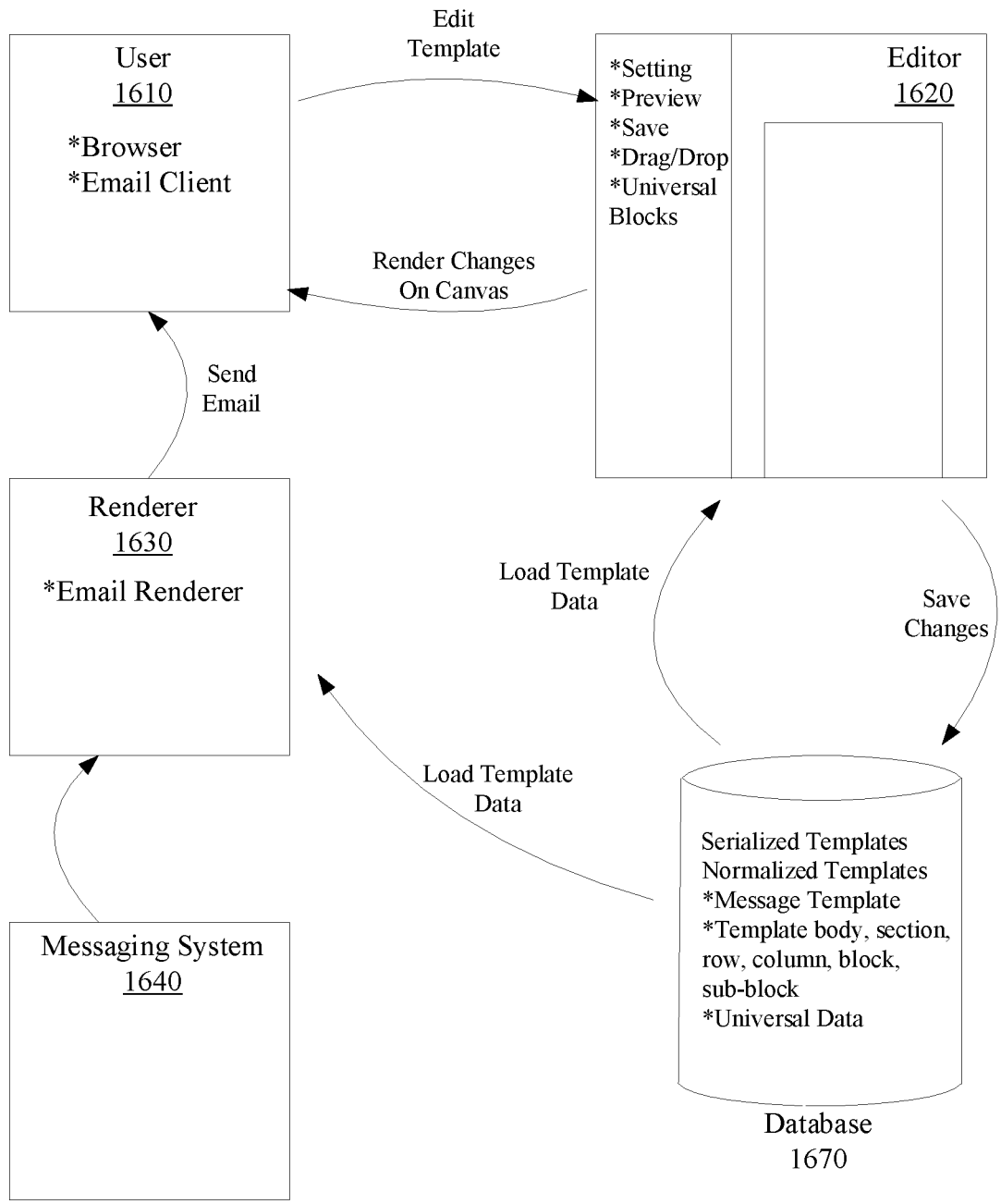
FIG. 16 shows a system that operates to perform template serialization for pre-rendering and versioning, according to an embodiment.

FIG. 16 is a system that operates to perform template serialization for pre-rendering and versioning, according to an embodiment. For an embodiment, FIG. 16 represents the beginning steps of a user client machine 1610 working with a customized template within an email template editor 1620 where the email template editor loads the selected customized template from the database 1670 and enables the user to make and save changes to the selected customized template which are saved back to the database 1670. The database 1670 serves to power an email renderer 1630 where the email renderer 1630 is triggered by a messaging system 1640 to generate HTML output which then is sent back to the user client machine 1610 into an email inbox. When the email renderer 1630 is complete it notifies the messaging system 1640 that the email has been rendered.

Figure 17A:
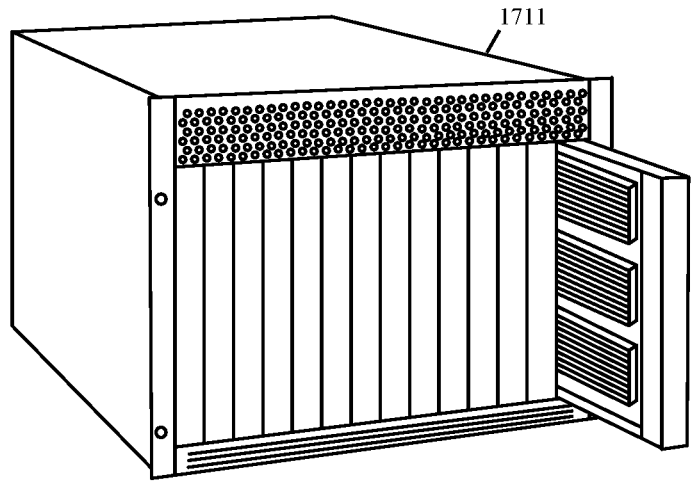
FIG. 17A shows a server system of rack-mounted blades, according to one or more embodiments of the present subject matter.

FIG. 17A shows a server system of rack-mounted blades for implementing the present subject matter. Various examples are implemented with cloud servers, such as ones implemented by data centers with rack-mounted server blades. FIG. 17A shows a rack-mounted server blade multi-processor server system 1711. Server system 1711 comprises a multiplicity of network-connected computer processors that run software in parallel.

Figure 17B:
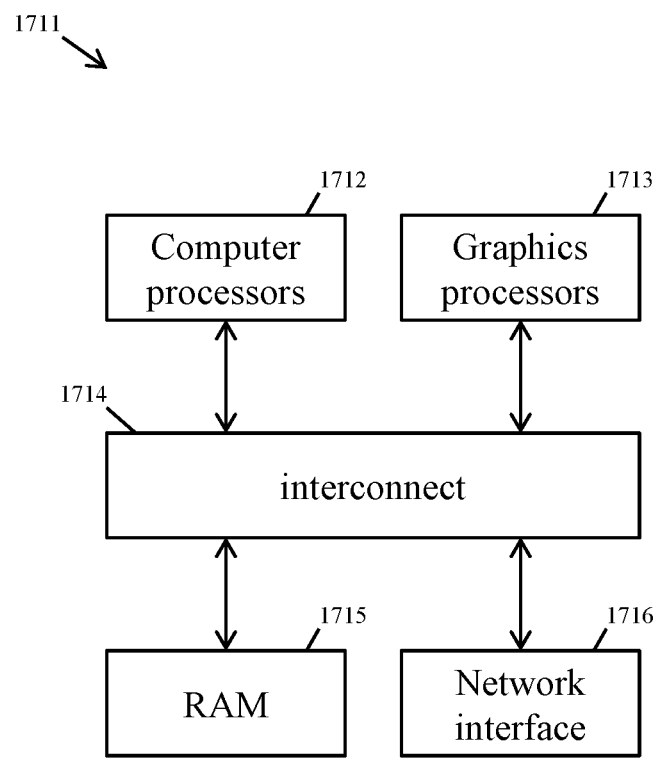
FIG. 17B shows a diagram of a networked data center server, according to one or more embodiments of the present subject matter.

FIG. 17B shows a diagram of a server system 1711. It comprises a multicore cluster of computer processors (CPU) 1712 and a multicore cluster of the graphics processors (GPU) 1713. The processors connect through a board-level interconnect 1714 to random-access memory (RAM) devices 1715 for program code and data storage. Server system 1711 also comprises a network interface 1716 to allow the processors to access the Internet, non-volatile storage, and input/output interfaces. By executing instructions stored in RAM devices 1715, the CPUs 1712 and GPUs 1713 perform steps of methods described herein.

Figure 18A:
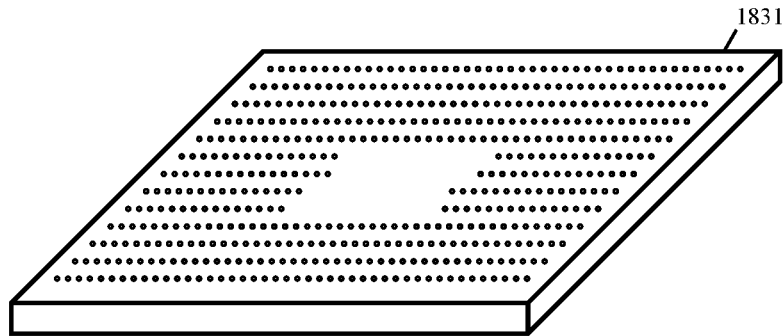
FIG. 18A shows a packaged system-on-chip device, according to one or more embodiments of the present subject matter.

FIG. 18A shows the bottom side of a packaged system-on-chip device 1831 with a ball grid array for surface-mount soldering to a printed circuit board. Various package shapes and sizes are possible for various chip implementations. System-on-chip (SoC) devices control many embedded systems, IoT device, mobile, portable, and wireless implementations.

Figure 18B:
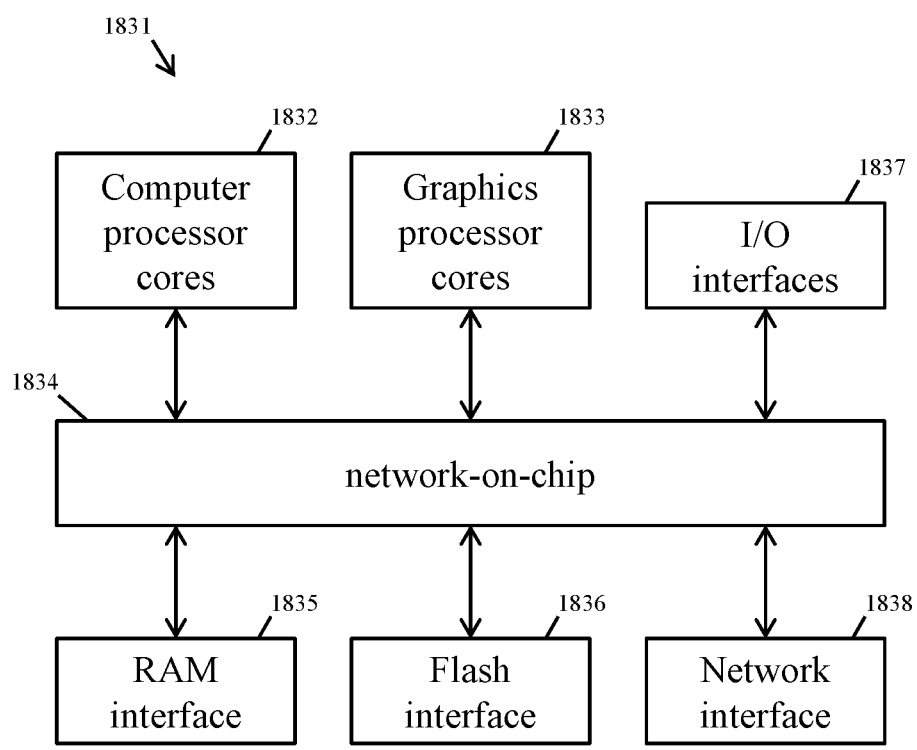
FIG. 18B shows a block diagram of a system-on-chip, according to one or more embodiments of the present subject matter.

FIG. 18B shows a block diagram of the system-on-chip 1831. It comprises a multicore cluster of computer processor (CPU) cores 1832 and a multicore cluster of graphics processor (GPU) cores 1833. The processors connect through a network-on-chip 1834 to an off-chip dynamic random access memory (DRAM) interface 1835 for volatile program and data storage and a Flash interface 1836 for non-volatile storage of computer program code in a Flash RAM non-transitory computer readable medium. SoC 1831 also has a display interface for displaying a graphical user interface (GUI) and an I/O interface module 1837 for connecting to various I/O interface devices, as needed for different peripheral devices. The I/O interface enables sensors such as touch screen sensors, geolocation receivers, microphones, speakers, Bluetooth® peripherals, and USB devices, such as keyboards and mice, among others. SoC 1831 also comprises a network interface 1838 to allow the processors to access the Internet through wired or wireless connections such as WiFi®, 3G, 4G long-term evolution (LTE), 5G, and other wireless interface standard radios as well as Ethernet connection hardware. By executing instructions stored in RAM devices through interface 1835 or Flash devices through interface 1836, the CPU cores 1832 and GPU cores 1833 perform functionality as described herein.

Examples shown and described use certain spoken languages. Various embodiments work, similarly, for other languages or combinations of languages. Examples shown and described use certain domains of knowledge and capabilities. Various systems work similarly for other domains or combinations of domains.

Some systems are screenless, such as an earpiece, which has no display screen. Some systems are stationary, such as a vending machine. Some systems are mobile, such as an automobile. Some systems are portable, such as a mobile phone. Some systems are for implanting in a human body. Some systems comprise manual interfaces such as keyboards or touchscreens.

Some systems function by running software on general-purpose programmable processors (CPUs) such as ones with ARM or x86 architectures. Some power-sensitive systems and some systems that require especially high performance, such as ones for neural network algorithms, use hardware optimizations. Some systems use dedicated hardware blocks burned into field-programmable gate arrays (FPGAs). Some systems use arrays of graphics processing units (GPUs). Some systems use application-specific-integrated circuits (ASICs) with customized logic to give higher performance.

Some physical machines described and claimed herein are programmable in many variables, combinations of which provide essentially an infinite variety of operating behaviors. Some systems herein are configured by software tools that offer many parameters, combinations of which support essentially an infinite variety of machine embodiments.

Several aspects of implementations and their applications are described. However, various implementations of the present subject matter provide numerous features including, complementing, supplementing, and/or replacing the features described above. In addition, the foregoing description, for purposes of explanation, used specific nomenclature to provide a thorough understanding of the embodiments of the invention. However, it will be apparent to one skilled in the art that the specific details are not required in order to practice the embodiments of the invention.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Practitioners skilled in the art will recognize many modifications and variations. Changes may be made in detail, especially matters of structure and management of parts within the principles of the embodiments of the present invention to the full extent indicated by the broad general meaning of the terms in which the appended claims are expressed.

Having disclosed exemplary embodiments and the best mode, modifications and variations may be made to the disclosed embodiments while remaining within the scope of the embodiments of the invention as defined by the following claims.

What is claimed is:

1. A computer-implemented method of template management, the method comprising:
   receiving, at a template management server, a first template comprising a first plurality of components;
   receiving a designation of a universal component from the first plurality of components;
   assigning a distinct object identifier to the universal component;
   saving component data of the universal component, wherein the component data comprises various component attributes that define content and format of the universal component;
   receiving a user's selection of the universal component in a second template;
   receiving position data of the universal component based on the user's selection, wherein the position data indicates a preferred position of the universal component within the second template;
   generating, based at least partially on the distinct object identifier, a pointer directing to the component data of the universal component;
   retrieving the component data and the position data of the universal component in the second template;
   displaying, at a client device, the universal component at the preferred position within the second template based on the received position data, wherein the received position data corresponds to a first user's position selection for the universal component within the first template;
   receiving a first modification of the universal component related to one of the first template and the second template;
   updating the component data of the universal component based on the first modification for both the first template and the second template;
   generating, by the template management server, an option to connect or disconnect the universal component to the second template;
   displaying the option to the user via the user interface;
   receiving a user input in response to the option to disconnect the universal component to the second template;
   disconnecting the component data of the universal component to the second template;
   generating a copy of the component data of the universal component for the second template; and
   receiving a second modification of the copy of the component data of the universal component, wherein the second modification does not impact the component data of the universal component for the first template.

2. The computer-implemented method of claim 1, further comprising:
   displaying, on a client device, a template editor, wherein the template editor is configured to customize the first template and the second template.

3. The computer-implemented method of claim 2, further comprising:
   displaying, on a client device, the designated universal component in the template editor.

4. The computer-implemented method of claim 1, wherein the universal component is a section that can comprise one or more sub-components.

5. The computer-implemented method of claim 4, wherein the one or more sub-components of the universal component comprise one or more related normalized data tables.

6. The computer-implemented method of claim 1, wherein the universal component is a block that can comprise one or more subblocks.

7. The computer-implemented method of claim 1, wherein the first modification of the universal component is implemented via modifying the universal component associated with either the first template or the second template.

8. A computer-implemented method of template management, the method comprising:
receiving, at a template management server, a designation of a universal component;
assigning a distinct object identifier to the universal component;
saving component data of the universal component, wherein the component data comprises various component attributes that define content and format of the universal component;
receiving one or more templates comprising the universal component;
receiving respective position data of the universal component based on a user's selections;
generating, based at least partially on the distinct object identifier, one or more pointers directing to the component data of the universal component;
retrieving the component data of the universal component via the one or more pointers directing to the component data of the universal component;
retrieving the respective position data of the universal component based on the user's selections, wherein the respective position data indicates a position of the universal component within a first template of the one or more templates, wherein the user's selections corresponds to a selected position for the universal component within the first template;
displaying, at one or more client devices, the universal component within a second template of the one or more templates at a position based on the respective position data;
receiving a first modification of the universal component related to the first template of the one or more templates;
updating the component data of the universal component based on the first modification;
generating, by the template management server, an option to disconnect the universal component to the second template of the one or more templates;
displaying the option to the user via a user interface;
receiving a user input in response to the option to disconnect the universal component to the second template;
disconnecting the component data of the universal component to the second template;
generating a copy of the component data of the universal component for the second template; and
receiving a second modification of the copy of the component data of the universal component for the second template, wherein the second modification does not impact the component data of the universal component for the rest of the one or more templates.

9. The computer-implemented method of claim 8, further comprising:
displaying, on the one or more client devices, a template editor, wherein the template editor is configured to customize the one or more templates.

10. The computer-implemented method of claim 9, further comprising:
displaying, on the one or more client devices, the designated universal component in the template editor.

11. The computer-implemented method of claim 8, further comprising, prior to receiving, at a template management server, a designation of a universal component:
receiving, at a template management server, a first template comprising a plurality of components.

12. The computer-implemented method of claim 8, wherein the universal component comprises a section that can include one or more sub-components.

13. The computer-implemented method of claim 8, wherein the universal component comprises a block that can include one or more subblocks.

14. The computer-implemented method of claim 8, wherein the first modification of the universal component is implemented via modifying the universal component associated with any of the one or more templates.

15. The computer-implemented method of claim 8, wherein the universal component comprises one or more related normalized data tables.

16. A computer-implemented method of template management, the method comprising:
receiving, at a template management server, a designation of a universal component;
saving component data of the universal component, wherein the component data comprises various component attributes that define the content and format of the universal component;
assigning a distinct object identifier to the universal component;
receiving a request to add the universal component to a second template;
generating a pointer directing to the component data of the universal component at least partially based on the distinct object identifier;
retrieving the component data of the universal component via the pointer;
retrieving position data of the universal component based on a user's input wherein the position data indicates a preferred position of the universal component as contained within a first template;
displaying the universal component within the second template based on the component data and the position data of the universal component, wherein the position data indicates a preferred position of the universal component as contained within the first template;
receiving a first modification of the universal component related to the first template;
updating the component data of the universal component based on the first modification;
generating, by the template management server, an option to disconnect the universal component to the second template;
displaying the option to the user via a user interface;
receiving a user selection in response to the option to disconnect the universal component to the second template;
disconnecting the component data of the universal component to the second template;
generating a copy of the component data of the universal component for the second template; and receiving a second modification of the copy of the component data of the universal component, wherein the second modification does not impact the component data of the universal component for other templates comprising the universal component.

17. The computer-implemented method of claim 16, wherein the universal component comprises one or more related normalized data tables.

\* \* \* \* \*